United States Patent
Paul et al.

(10) Patent No.: US 12,174,057 B2
(45) Date of Patent: Dec. 24, 2024

(54) SYSTEMS AND METHODS FOR A USER INTERFACE FOR CALIBRATING A LOAD CELL

(71) Applicant: Stryker Corporation, Kalamazoo, MI (US)

(72) Inventors: Anish Paul, Kalamazoo, MI (US); Krishna Sandeep Bhimavarapu, Kalamazoo, MI (US); William D. Childs, Plainwell, MI (US); Connor F. St. John, Kalamazoo, MI (US); Gary L. Bartley, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 204 days.

(21) Appl. No.: 17/915,197

(22) PCT Filed: May 27, 2021

(86) PCT No.: PCT/US2021/034434
§ 371 (c)(1),
(2) Date: Sep. 28, 2022

(87) PCT Pub. No.: WO2021/242967
PCT Pub. Date: Dec. 2, 2021

(65) Prior Publication Data
US 2023/0122267 A1    Apr. 20, 2023

Related U.S. Application Data

(60) Provisional application No. 63/030,565, filed on May 27, 2020.

(51) Int. Cl.
*G01G 23/01* (2006.01)
*A61G 7/05* (2006.01)
*G01G 19/44* (2006.01)

(52) U.S. Cl.
CPC ......... *G01G 23/012* (2013.01); *A61G 7/0527* (2016.11); *G01G 19/445* (2013.01)

(58) Field of Classification Search
None
See application file for complete search history.

(56) References Cited

U.S. PATENT DOCUMENTS

| 4,869,266 A | 9/1989 | Taylor et al. |
| 7,472,439 B2 | 1/2009 | Lemire et al. |

(Continued)

OTHER PUBLICATIONS

International Search Report for Application No. PCT/US2021/034434 dated Aug. 25, 2021, 1 page.

*Primary Examiner* — Peter J Macchiarolo
*Assistant Examiner* — Jermaine L Jenkins
(74) *Attorney, Agent, or Firm* — Howard & Howard Attorneys PLLC

(57) ABSTRACT

A patient support apparatus includes a load cell, disposed between a base and a litter, that is configured to generate an output representative of a load acting on the patient support surface. The load cell is associated with a calibration reference symbol assigned to the load cell to define a calibration value for a parameter of the load cell. A user interface is configured to receive user input of a virtual symbol corresponding to the calibration reference symbol. A controller is configured to store a plurality of calibration reference symbols and a plurality of representative calibration values each associated with one of the plurality of calibration reference symbols, initiate a calibration procedure, determine a representative calibration value for each calibration reference symbol, calibrate the parameter of the load cell based on the representative calibration value determined based on the virtual symbol, and determine weight acting on the litter.

20 Claims, 20 Drawing Sheets

(56) References Cited

U.S. PATENT DOCUMENTS

| | | | |
|---|---|---|---|
| 7,702,481 | B2 | 4/2010 | Dionne et al. |
| 8,393,026 | B2 | 3/2013 | Dionne et al. |
| 8,689,376 | B2 | 4/2014 | Becker et al. |
| 8,701,229 | B2 | 4/2014 | Lemire et al. |
| 8,827,931 | B2 | 9/2014 | Dixon et al. |
| 9,383,251 | B2 | 7/2016 | Dixon et al. |
| 10,330,552 | B2 | 6/2019 | Uematsu |
| 10,940,065 | B2 | 3/2021 | Childs et al. |
| 11,058,325 | B2 * | 7/2021 | Kostic ............... A61G 7/0524 |
| 11,141,334 | B2 * | 10/2021 | Naber ............... A61G 1/0567 |
| 11,304,864 | B2 * | 4/2022 | Sweeney ............. A61G 7/015 |
| 11,304,865 | B2 * | 4/2022 | Furman ............... A61G 7/08 |
| 2003/0076115 | A1 | 4/2003 | Yamasaki |
| 2014/0237721 | A1 | 8/2014 | Lemire et al. |
| 2017/0234723 | A1 | 8/2017 | Charles et al. |
| 2019/0219438 | A1 | 7/2019 | Kostic et al. |

\* cited by examiner

Sensitivity Calibration Table

| Load Cell Identifier | Sensitivity "S" (mv/V) | Batch | Representative S Calibration Value (mv/V) |
|---|---|---|---|
| 790920A | 1.0795 | | |
| 790916A | 1.0836 | | |
| 790915A | 1.0847 | | |
| 791019A | 1.0864 | | |
| 790910A | 1.0865 | | |
| 790905A | 1.0871 | A | 1.086 |
| 790676A | 1.0874 | | |
| 790913A | 1.0876 | | |
| 791014A | 1.088 | | |
| 790902A | 1.0894 | | |
| 791011A | 1.0903 | | |
| 790918A | 1.0911 | | |
| 790675A | 1.0914 | | |
| 790919A | 1.0917 | | |
| 790901A | 1.0918 | | |
| 790912A | 1.092 | | |
| 791012A | 1.0922 | | |
| 790900A | 1.0934 | B | 1.093 |
| 790674A | 1.0934 | | |
| 790904A | 1.0941 | | |
| 790908A | 1.0944 | | |
| 791018A | 1.0944 | | |
| 791017A | 1.0954 | | |
| 791010A | 1.0956 | | |
| 791013A | 1.0962 | | |
| 790914A | 1.0963 | | |
| 790677A | 1.1007 | | |
| 791015A | 1.1022 | | |
| 790906A | 1.1093 | C | 1.120 |
| 791009A | 1.1136 | | |
| 790903A | 1.1371 | | |
| 790917A | 1.1427 | | |
| 790911A | 1.1478 | | |
| 790907A | 1.1522 | | |
| 791022A | 2.1007 | | |
| 791021A | 3.1007 | | |
| 791020A | 4.1007 | D | 4.101 |
| 791023A | 5.1007 | | |
| 791025A | 6.1007 | | |

FIG. 6A

| Zero-Balance Calibration Table | | | |
|---|---|---|---|
| Load Cell Identifier | Zero-Balance "ZB" (mv/V) | Batch | Representative ZB Value (mv/V) |
| 790675A | -0.4800 | W | -0.246 |
| 790676A | -0.3900 | | |
| 790919A | -0.1500 | | |
| 791010A | -0.1200 | | |
| 791012A | -0.0900 | | |
| 790903A | 0.0300 | X | 0.146 |
| 790908A | 0.0300 | | |
| 790912A | 0.0900 | | |
| 790907A | 0.0900 | | |
| 791014A | 0.0900 | | |
| 790910A | 0.1500 | | |
| 790916A | 0.1500 | | |
| 790921A | 0.1500 | | |
| 791013A | 0.1500 | | |
| 790901A | 0.2100 | | |
| 790918A | 0.2100 | | |
| 791009A | 0.2100 | | |
| 790905A | 0.2400 | | |
| 790904A | 0.2400 | | |
| 790917A | 0.2700 | Y | 0.374 |
| 790920A | 0.2700 | | |
| 791019A | 0.3000 | | |
| 790913A | 0.3300 | | |
| 790914A | 0.3300 | | |
| 790915A | 0.3300 | | |
| 791011A | 0.3600 | | |
| 790900A | 0.4200 | | |
| 791018A | 0.4200 | | |
| 790902A | 0.4500 | | |
| 790906A | 0.4500 | | |
| 790911A | 0.4500 | | |
| 790674A | 0.4800 | | |
| 791017A | 0.5100 | Z | 1.163 |
| 791015A | 0.5100 | | |
| 791021A | 1.3800 | | |
| 791025A | 1.3800 | | |
| 790677A | 1.3800 | | |
| 791022A | 1.3800 | | |
| 791020A | 1.3800 | | |
| 791023A | 1.3800 | | |

FIG. 6B

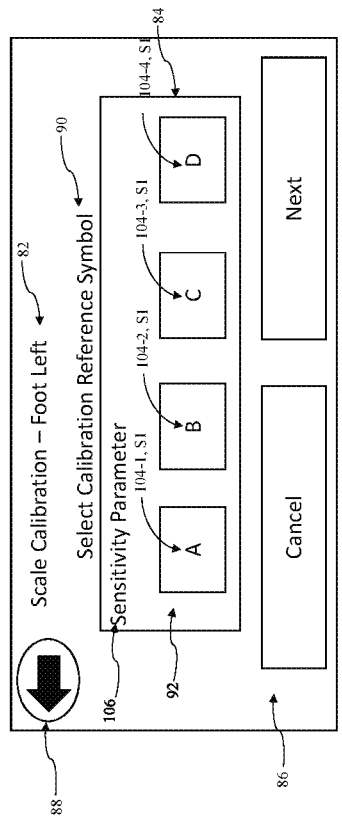
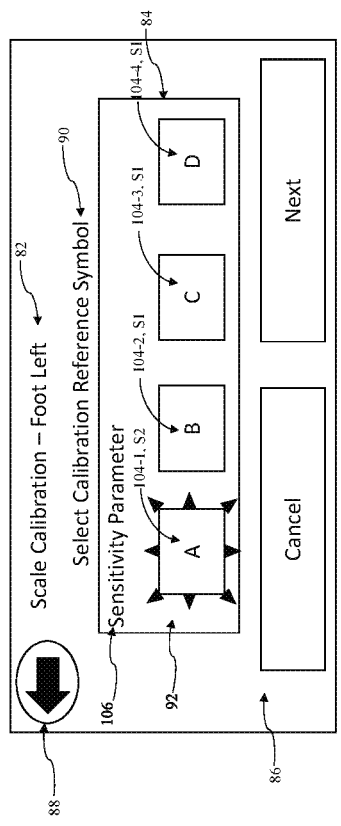
FIG. 8A
FIG. 8B

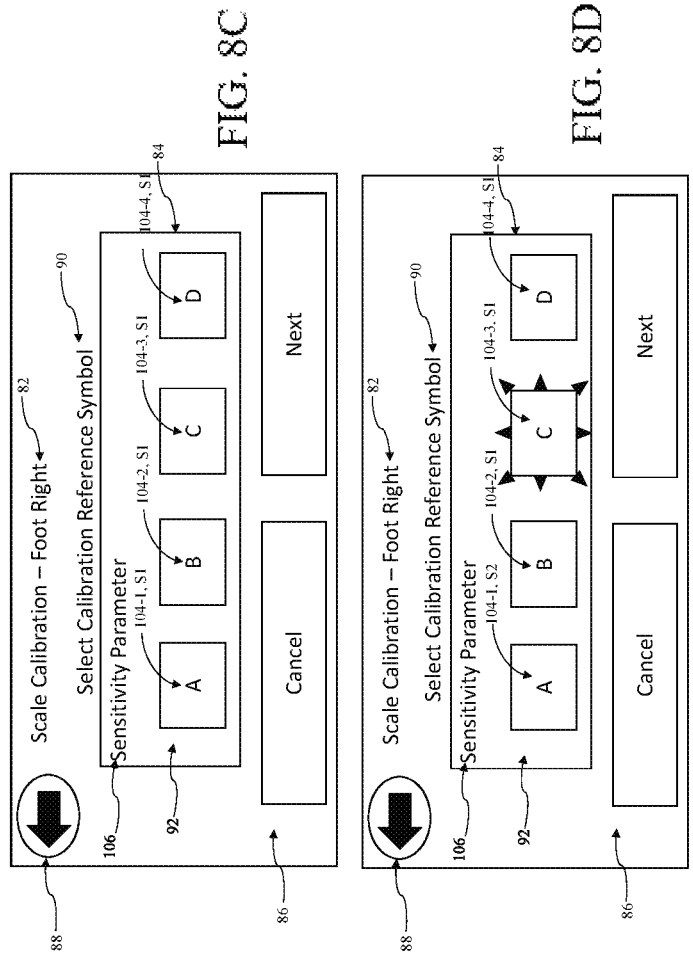

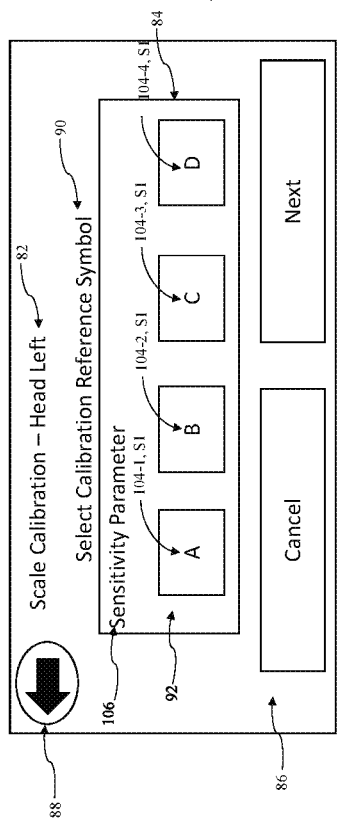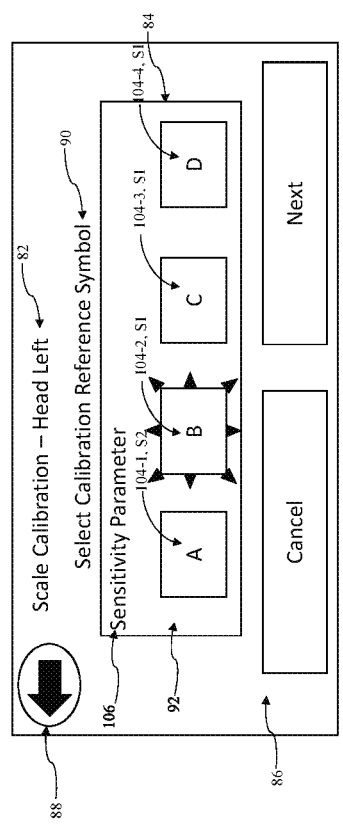

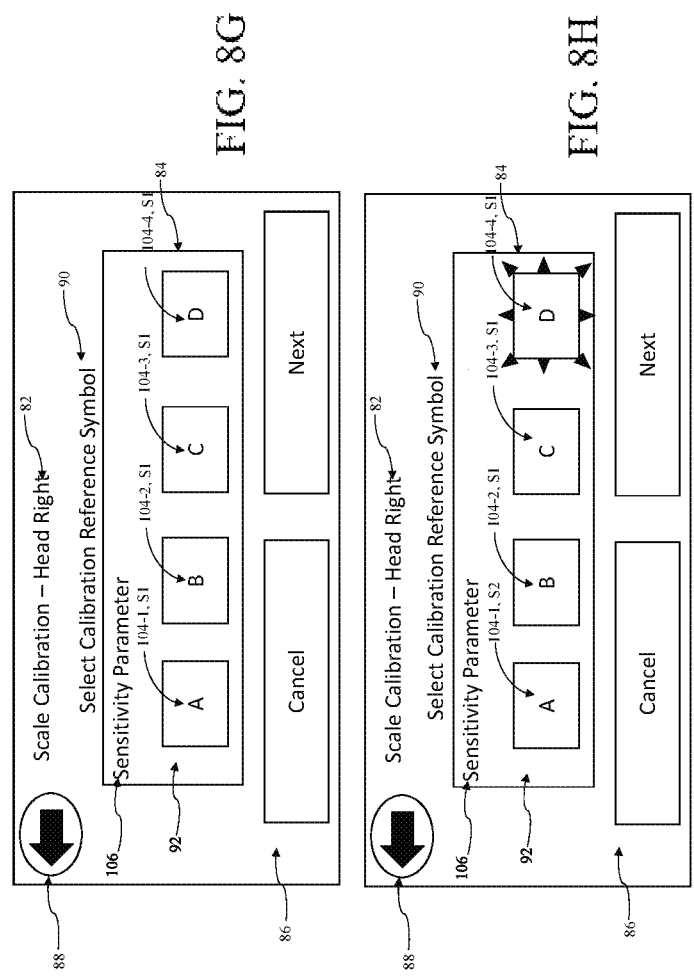

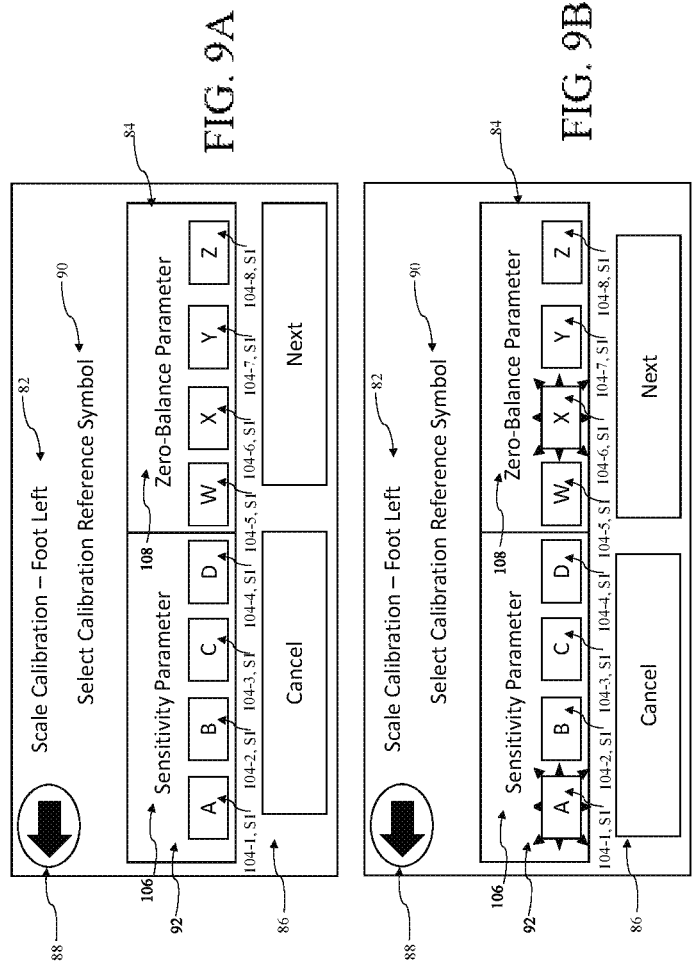

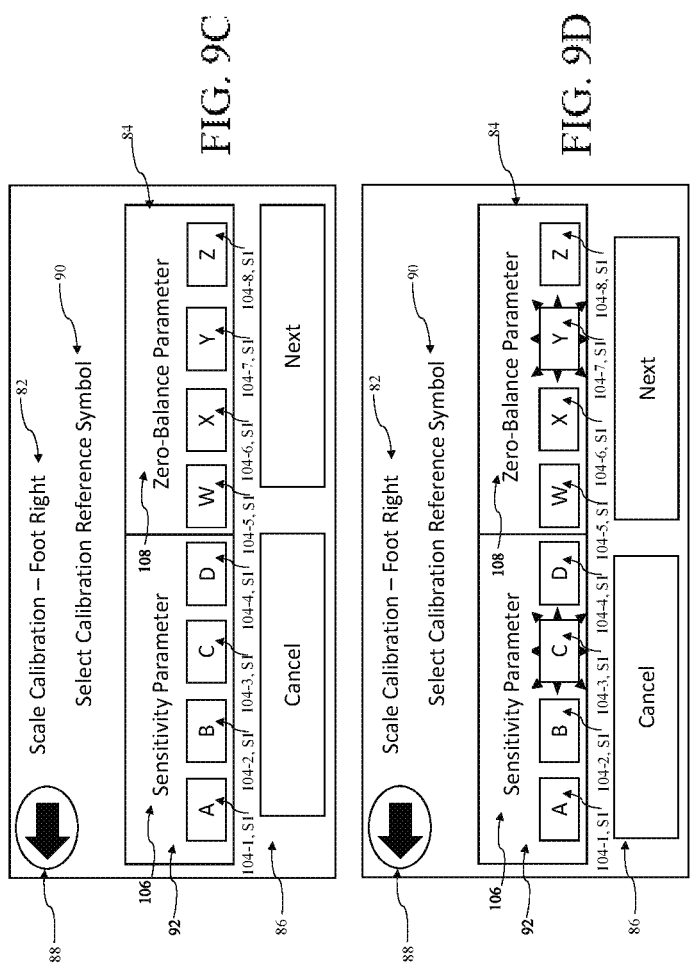

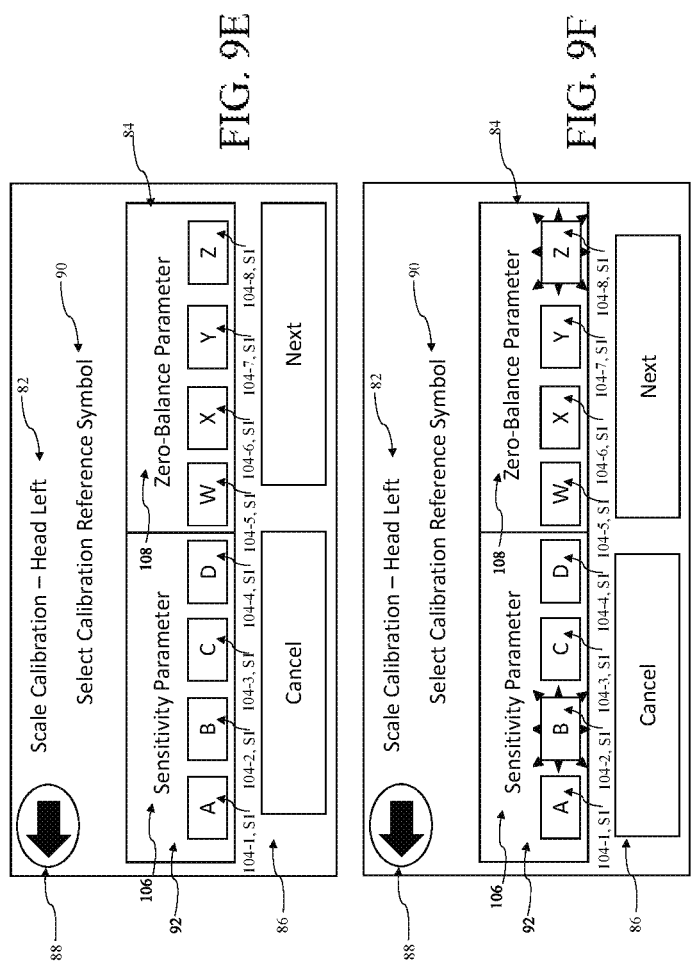

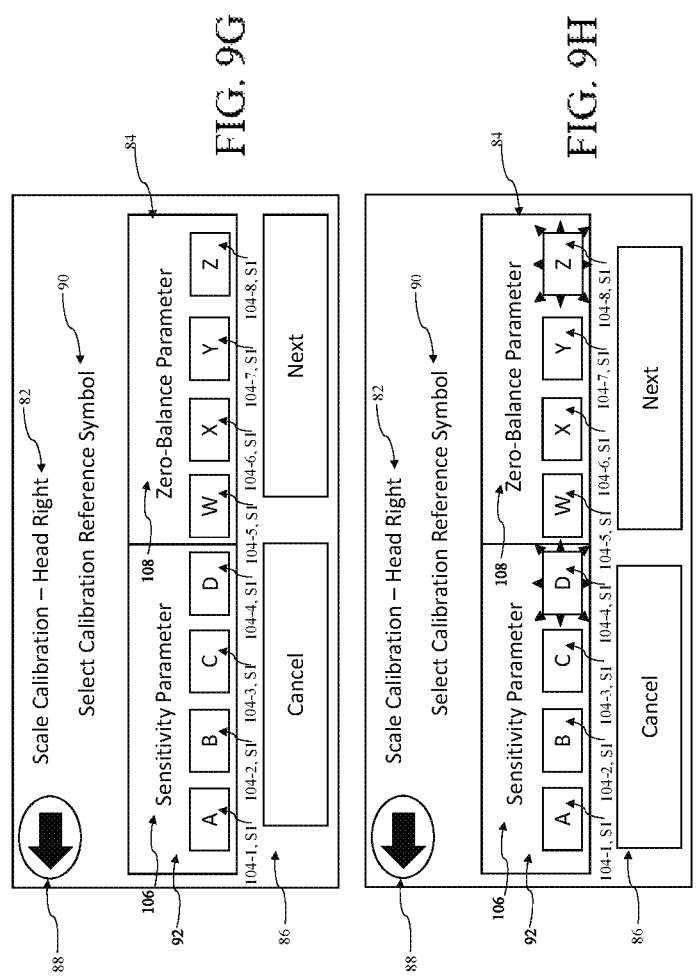

SYSTEMS AND METHODS FOR A USER INTERFACE FOR CALIBRATING A LOAD CELL

CROSS-REFERENCE TO RELATED APPLICATIONS

The subject patent application claims priority to and all the benefits of U.S. Provisional Patent Application No. 63/030,565, filed on May 27, 2020, the entire contents and disclosure of which is hereby incorporated by reference in its entirety.

BACKGROUND

The weight of a patient is monitored very closely in many types of conventional healthcare settings. For example, a caregiver or medical professional may weigh the patient several times throughout the day. The patient weight measurement is an important variable to consider when devising an effective patient care plan. For patients who are not mobile and cannot stand on their own feet, using a free-standing scale is impractical or otherwise feasible.

Patient support apparatuses facilitate care of a patient in a health care setting. Patient support apparatuses may be realized as beds, cots, stretchers, operating tables, recliners, wheelchairs, and the like. Certain types of conventional patient support apparatuses may include one or more sensors, such as load cells, pressure sensors, strain gauges, and the like, that are used to detect or otherwise monitor the weight of an occupant. These sensors can be used to calculate the patient's weight, monitor the patient's position, and/or be utilized as part of an exit detection system. Here, outputs of sensors (e.g., load cells) may be used by a controller to, among other things, determine a weight of the patient, determine when the patient has exited the bed, determine when the patient may be about to exit the bed, and the like.

Sensors realized as load cells typically conform to one or more standard ranges, output values, and the like, but certain factors (e.g., variations during manufacturing) necessitate that load cells each be calibrated during installation, when replaced, and periodically throughout the life of the load cell. In general terms, load cell calibration involves adjusting one or more parameters so that output values of the load cell conform to one or more predetermined standards. In systems which utilize multiple load cells, it will be appreciated that proper calibration of each load cell in the system ensures that the load cell system provides accurate and reliable measurements.

In order to facilitate calibrating load cells, calibration values for the sensitivity parameter and the zero-balance parameter of a load cell may be provided by the manufacturer, or may also be determined based on testing, and are typically printed on the load cell (e.g., on a label). During manufacture of the patient support apparatus, and/or when replacing or otherwise calibrating load cells of a patient support apparatus, a technician generally has to ensure that the correct calibration values entered into or otherwise known by the controller. To this end, the technician may manually enter the calibration values for each load cell using a user interface, a service tool, and the like. Here, it will be appreciated that the calibration values generally include a number of significant figures (e.g., 0.9424 or 0.9413). Due to the number of significant figures that must be entered in order to calibrate the load cell properly, it is possible for the technician to accidentally enter an incorrect value when inputting the calibration values, which leads to improper calibration of the load cell. This, in turn, can result in inaccurate weight measurements, inaccurate bed exit detection, and the like.

While patient support apparatuses with weight sensors such as load cells have generally performed well for their intended use, there remains a need in the art for consistent reliability of weight measurement systems while, at the same time, reducing the cost and complexity of installing and/or replacing weight sensors used in connection with patient support apparatuses.

SUMMARY

The present disclosure provides a patient support apparatus including a base and a litter defining a patient support surface to support a patient thereon. A load cell is disposed between the base and the litter and is configured to generate a load output representative of a load acting on the patient support surface. The load cell is associated with a calibration reference symbol assigned to the load cell to define a parameter of the load cell. A user interface is configured to receive user input of a virtual symbol corresponding to the calibration reference symbol. A controller in communication with the load cell and the user interface is being configured to: store a plurality of calibration reference symbols each associated with a respective batch of predefined calibration values, and a plurality of representative calibration values each associated with one of the plurality of calibration reference symbols; initiate a calibration procedure in response to a user selected calibration event; determine a representative calibration value based on the virtual symbol received from the user interface associated with the respective batch of predefined calibration values; calibrate the parameter of the load cell based on the representative calibration value determined based on the virtual symbol; and determine weight acting on the litter based on the calibrated parameter of the load cell.

The present disclosure also provides a method for calibrating a load cell of a patient support apparatus, the method including: receiving, using a user interface, a user selected calibration event; receiving, using the user interface, user input of a virtual symbol corresponding to a calibration reference symbol of the load cell to define a calibration value for a parameter of the load cell; initiating, using a controller in communication with the load cell and the user interface, a calibration process in response to the user selected calibration event; determining a representative calibration value based on the virtual symbol received from the user interface associated with a respective batch of predefined calibration values; calibrating the parameter of the load cell based on the representative calibration value determined based on the virtual symbol; generating, using the load cell, a load output representative of a load acting on the patient support apparatus; and determining weight acting on a litter of the patient support apparatus based on the calibrated parameter of the load cell and the load output.

BRIEF DESCRIPTION OF THE DRAWINGS

The present disclosure will become more fully understood from the detailed description and the accompanying drawings.

FIGS. 6A and 6B depict calibration tables showing a plurality of load cells grouped into batches with representative predefined calibration values according to the teachings of the present disclosure.

FIGS. 8A-8H depict screens of a user interface associated with a first step of a two-step process for inputting calibration values for a sensitivity parameter of a load cell system according to the teachings of the present disclosure.

FIGS. 9A-9H depict screens of a user interface associated with a first step of a two-step process for inputting calibration values for a sensitivity parameter and a zero-balance parameter of a load cell system according to the teachings of the present disclosure.

In the drawings, reference numbers may be reused to identify similar and/or identical elements.

DETAILED DESCRIPTION

Figure 1:
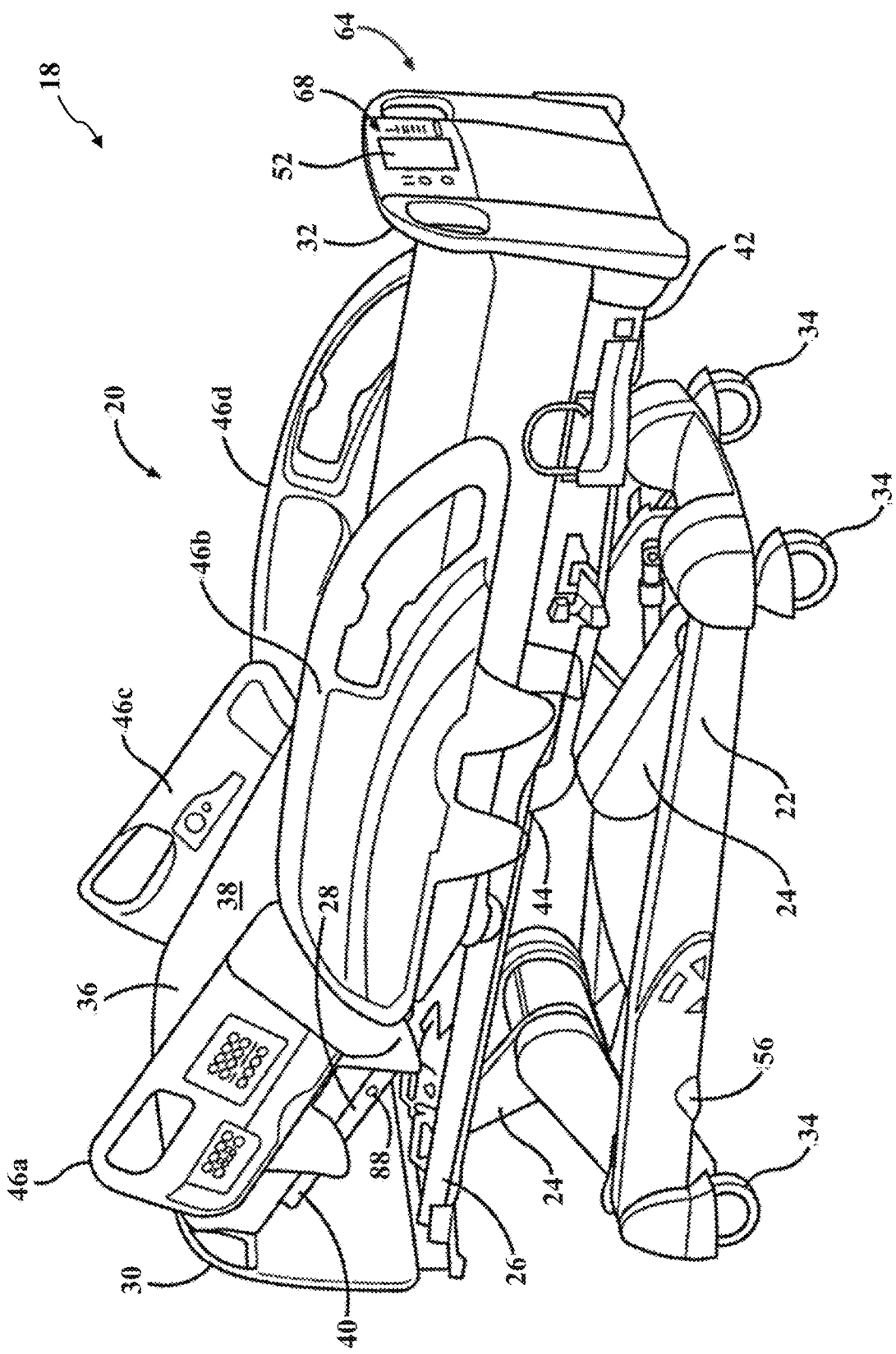
FIG. 1 depicts a perspective view of a patient support apparatus provided as a hospital bed with the head section in an elevated position including a load cell system according to the teachings of the present disclosure.

Referring now to FIG. 1, an exemplary patient support apparatus 18 is shown for supporting a patient in a health care setting. The representative patient support apparatus 18 is realized as a bed 20 that is generally adapted for use in a hospital or other medical setting. Although the particular form of patient support apparatus 18 illustrated in FIG. 1 is a bed 20, it should be understood that other types of patient support apparatuses 18 are contemplated by the present disclosure, including without limitation: stretchers; gurneys; cots; trolleys; operating tables; benches; and wheelchairs, as well as traditional chairs, seats, recliners, or any other similar type of structure capable of supporting a patient and having the hardware and software for obtaining a weight measurement of the patient, whether stationary or mobile and/or whether used for medical or residential environments. In still other aspects, the patient support apparatus 18 may be configured to change in shape and function, for example, between a stretcher or bed and a chair (not shown, but generally known in the related art). Other configurations are contemplated.

The patient support apparatus 18 shown in FIG. 1 generally includes a base 22, a lift mechanism comprising lifts 24, a litter 26 with a patient support deck 28, a headboard 30, and a footboard 32. Each of these components will be described in greater detail below. The base 22 includes a plurality of wheels 34 that may be selectively locked and unlocked so that, when unlocked, the patient support apparatus 18 is able to be wheeled to different locations. The wheels 34 may be steering type wheels, with castors or otherwise configured to swivel 360 degrees; other wheels may not be swivelable. The base 22 may include one or more retractable wheels (not shown) to provide controlled traction and cornering. The base 22 may also include one or more powered wheels, the movement of which may be operated by a controller. Wheels 34 may be provided with locking or braking mechanisms (not shown in detail).

The lifts 24 form part of a lift mechanism employed to raise and lower the litter 26 with respect to the base 22. In this regard, the lifts 24 may include hydraulic actuators, electric actuators, or any other suitable device for raising and lowering the litter 26 with respect to the base 22. In some versions, the lifts 24 may operate independently so that the orientation of litter 26 with respect to the base 22 may also be adjusted. The lifts 24 may be of various designs, types, and/or configurations. In some versions, the lifts 24 may be configured to raise and lower extending legs or columns in a substantially vertical direction, while others may include linkages, hinges, and the like, such as a scissor type lift mechanisms having linked, folding supports in a crisscross or 'X' pattern. Other configurations are contemplated.

In the representative version illustrated herein, the litter 26 of the patient support apparatus 18 comprises a frame that provides a structure for coupling with the lift mechanism, as well as the support deck 28, the headboard 30, and the footboard 32. The patient support deck 28 provides a surface on which a mattress 36 may be positioned or arranged, defining a patient support surface 38 for a patient to lay or sit on. The support deck 28 may be realized with a plurality of sections, some of which may be movable (e.g., pivotable) relative to each other so as to articulate the patient support surface 38 in ways that provide support to the patient in various configurations (e.g., a flat configuration, a fowler configuration, and the like). In the version shown in FIG. 1, the support deck 28 includes a head section 40, a foot section 42, and one or more intermediate sections 44. The head section 40 (also referred to as a fowler section) is pivotable with respect to the intermediate section 44 between a generally horizontal orientation and a plurality of raised positions (one of which is shown in FIG. 1). The foot section 42 is also pivotable with respect to the intermediate section 44 between a generally horizontal orientation (shown in FIG. 1) and a plurality of lowered positions (not shown). In certain aspects, the head section 40 may be lowered, and the foot section 42 may be raised or elevated with respect to the intermediate section 44, for example to increase blood flow to the patient's upper body. The base 22, the lifts 24, the litter 26, the support deck 28 and its various sections 40, 42, 44, as well as other movable components of the patient support apparatus 18, may each be provided with the necessary mechanical structures, actuators, automated drive mechanisms, and the like, to facilitate movement, control, and related capabilities of the patient support apparatuses 18.

Certain types of patient support apparatuses 18 may also include one or more side rails, collectively referred to by reference number 46. For example, the bed of FIG. 1 includes a right head side rail 46a, a right foot side rail 46b, a left head side rail 46c, and a left foot side rail 46d. The side rails 46 are generally movable between a raised position and a lowered position, and in various aspects may be locked or movable to one or more intermediate positions. The side rails 46 may be provided with handle areas (not shown in detail) for use by the patient or caregiver. In the configuration shown in FIGS. 1-2, all four of the side rails 46 are raised. As shown in FIG. 1, an interior side of the head side rails 46a, 46c may be provided with a patient control interface 48 configured to operate movement of the head section 40 and foot section 42, the lifts 24, as well as control other auxiliary features, such as lights, televisions, sound control, and the like. Other configurations are contemplated.

As shown in FIG. 1, the footboard 32 may also be provided with a user interface 68 including a touch display 52. While the user interface 68 is provided on the footboard 32 in this representative version, it will be appreciated that one or more user interfaces 68 may be provided in other suitable locations, such as on an exterior side of the head side rails 46a, 46c. As is described in greater detail below, the user interface 68 is configured to provide instructions, information, and other output (e.g., graphics) to a user (e.g., a caregiver), and is further configured to receive input from the user. The user interface 68 is configured to receive the inputs from the user in any suitable manner including, but not limited to, mechanical actuation, voice commands, a virtual keyboard, and gesturing. In some versions, the user may provide the input to user interface 68 by engaging a virtual button displayed as a part of a graphical user interface (GUI) of the user interface 68. However, other configurations are contemplated.

A controller 64 is provided to facilitate controlling various aspects of the patient support apparatus 18, and is disposed in communication with the user interface 68. Here, certain aspects of the patient support apparatus 18, such as operation of the lifts 24, may be based on input provided by the user engaging the user interface 68. In some versions, the controller 64 may include at least one processor with memory and software programmable to control various aspects of the bed 20. As will be appreciated from the subsequent description below, the teachings of the present disclosure may be used with various types of control systems, and may generally include a computing device or the controller 64, such as a control module with a processor, a memory, and the user interface 68. It should be understood that although particular systems or subsystems may be defined herein, each or any of the systems may be otherwise modified, combined, or segregated via appropriate hardware and/or software as is known to those of ordinary skill in the art.

The controller 64 may be a portion of another control device, a stand-alone unit, or other system, including cloud-based systems. Alternatively, the controller 64 may be defined by multiple computing devices. In general, the controller 64 may include any one or more microprocessors, microcontrollers, field programmable gate arrays (FPGA), systems on a chip, volatile or nonvolatile memory, discrete circuitry, and/or other hardware, software, or firmware that is capable of carrying out the instructions and functions described herein, as would be known to one of ordinary skill in the art. Such components may be physically configured in any suitable manner, such as by mounting them to one or more circuit boards, or arranging them in other manners, whether combined into a single unit or distributed across multiple units. The instructions followed by the controller 64 in carrying out the functions described herein, as well as the data necessary for carrying out these functions, may be stored in memory accessible to the controller 64. In addition to monitoring the outputs of the load cells 60, the controller 64 also may control other aspects of the patient support apparatus 18 (e.g., motion), and/or may be in communication with one or more other controllers 64 that control the other aspects of the patient support apparatus 18. Other configurations are contemplated.

In some versions, the controller 64 may be located out of view, for example, secured in the base 22 or coupled to the litter 26. One or more controllers 64 may be realized as external units. Controllers 64 may communicate with various components of the patient support apparatus 18, such as sensors, actuators, motors, and the like, via wired or wireless electrical communication. Thus, the patient support apparatus 18 may also be provided with one or more communication modules 70 configured to establish wireless communication. Various wireless communication protocols may be used, including without limitation: Bluetooth, near-field communication (NFC), infrared communication, radio wave communication, cellular network communication, and wireless local area network communication (Wi-Fi). In certain aspects, a communication module 70 may be realized as part of the controller 64. Wireless communication may provide compatibility with information management systems. Not only may the patient support apparatus 18 be coupled to the controller 64 using wireless communication protocols, one or more patient support apparatuses 18 may establish a communication link directly or indirectly with one another in order to share data, information, and exhibit control.

Figure 2:
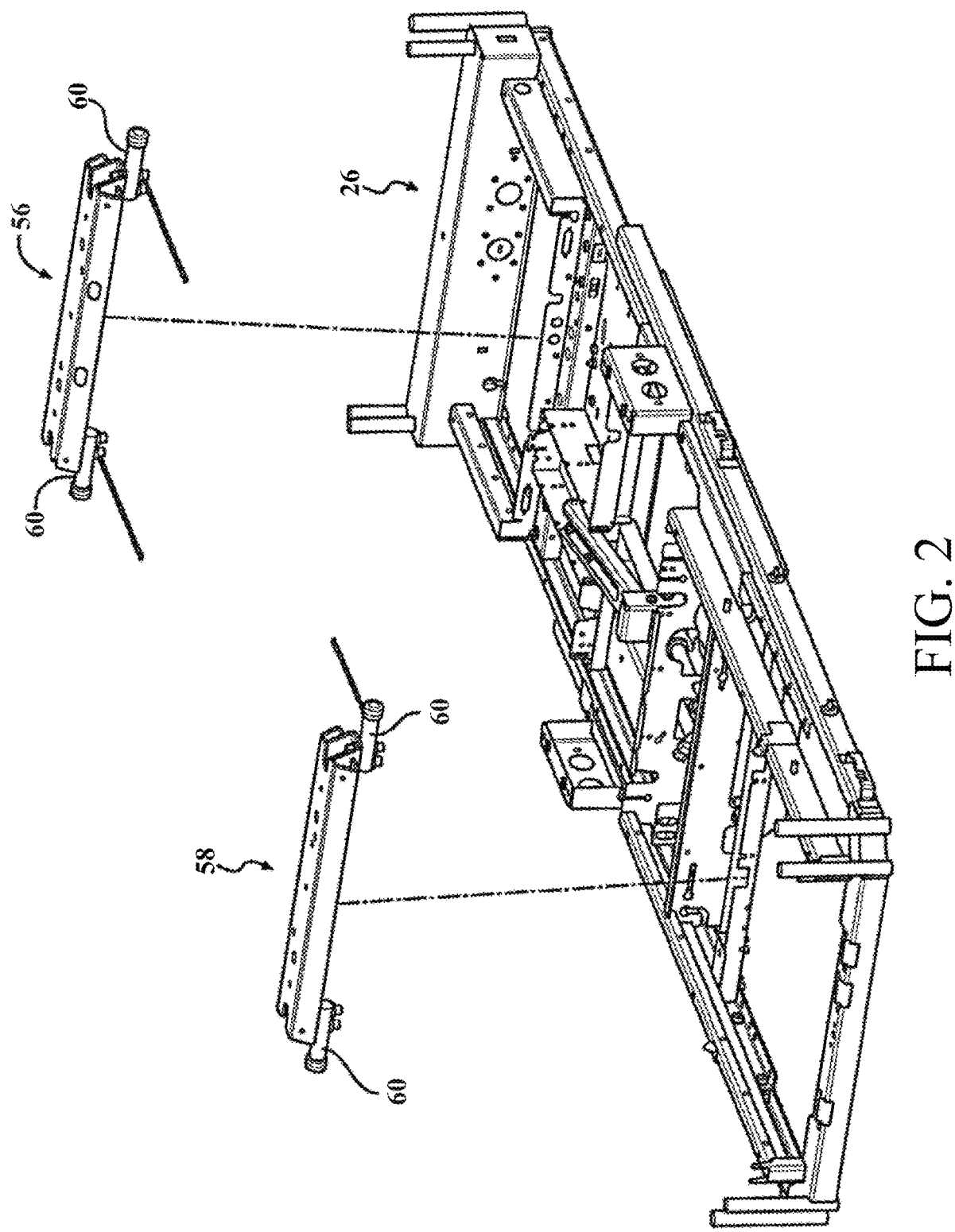
FIG. 2 depicts a perspective view of a litter and a load cell system including a pair of lift header assemblies having respective pairs of load cells of the patient support apparatus of FIG. 1 according to the teachings of the present disclosure.
Figure 3:
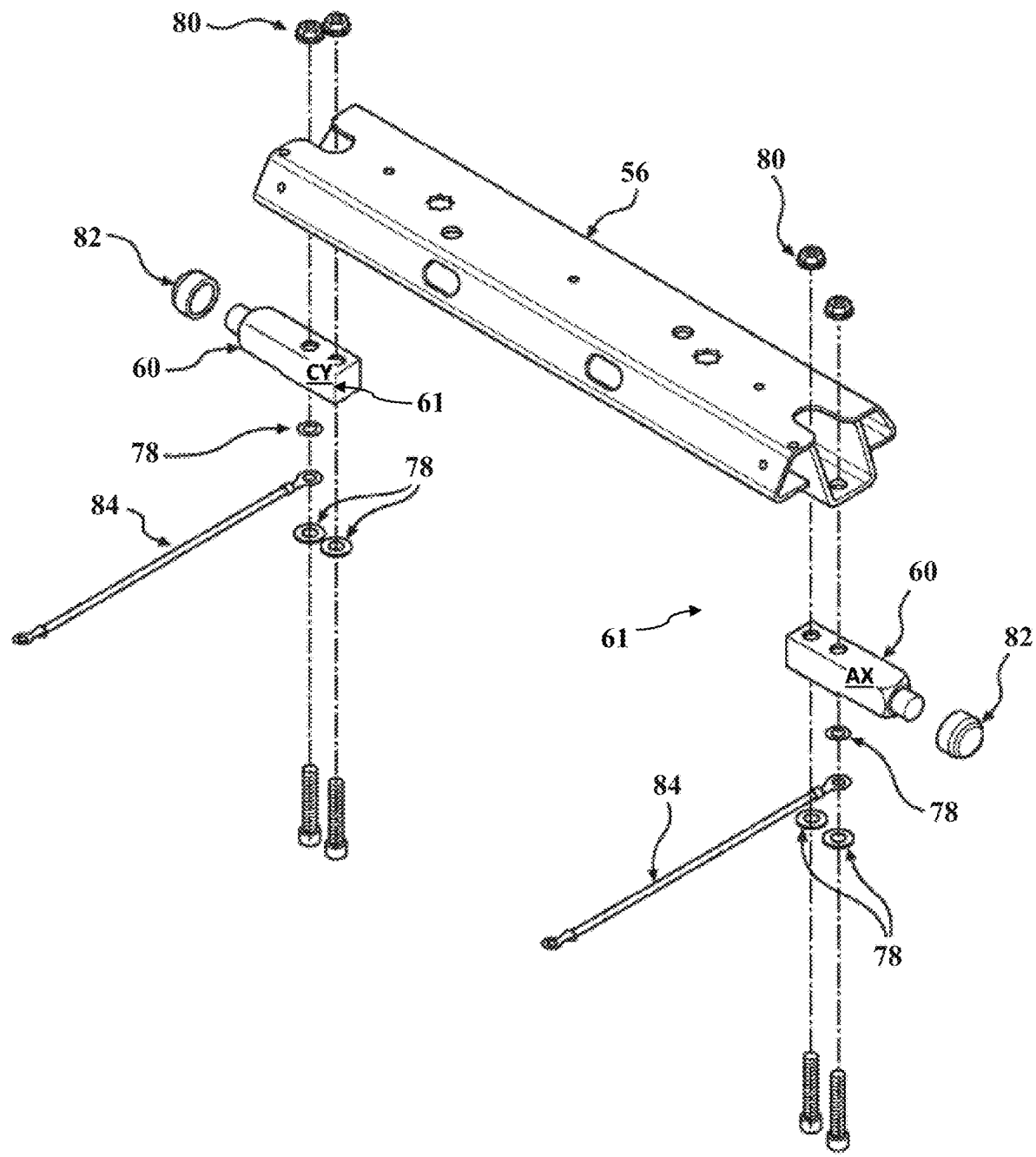
FIG. 3 depicts an exploded perspective view of one of the lift header assemblies of a load cell system as shown in FIG. 2 according to the teachings of the present disclosure.

FIG. 2 is a perspective view of an exemplary litter 26 of the patient support apparatus 18 of FIG. 1, shown with a pair of front and rear lift header assemblies 56, 58 that are respectively coupled to the lifts 24 (not shown in detail). Each lift header assembly 56, 58 is provided with a respective pair of load cells 60 which are used to measure patient weight as described in greater detail below. While a total of four load cells 60 are employed in the representative version illustrated herein, it should be understood that different numbers of load cells 60 may be utilized without departing from the scope of the present disclosure. For illustrative purposes, the litter 26 depicted in FIG. 2 is not shown attached to the base 22 and/or the lifts 24 depicted in FIG. 1, and other components (e.g., the support deck 28) are likewise not shown in FIG. 2. However, as shown in FIG. 1, the litter 26 is supported by the two lift header assemblies 56, 58 which, in turn, are coupled to the lifts 24. In FIG. 2, the lift header assemblies 56, 58 are shown elevated from the litter 26 in FIG. 2 for clarity. FIG. 3 is an exploded perspective view of the front lift header assembly 56 of FIG. 2.

When assembled, the front lift header assembly 56 is coupled to a top of a first one of the lifts 24, the rear lift header assembly 58 is coupled to a top of a second one of the lifts 24. The load cells 60 are configured to support the litter 26 and to measure force acting between the litter 24 and the lift header assemblies 56, 58 (e.g., to measure weight acting on the litter 26). In the representative versions shown throughout the drawings, the load cells 60 are configured such that they provide complete and exclusive mechanical support for the litter 26, and all of the other components that are supported on the litter 26 (e.g., the support deck 28, the headboard 30, the footboard 32, the side rails 46, and the like), relative to the lift mechanism. Thus, the load cells 60 are configured to detect the weight of not only those components of the patient support apparatus 18 that are supported by the litter 26 (including the litter 26 itself), but also any objects or persons that are wholly or partially being supported by the support deck 28.

Figure 4:
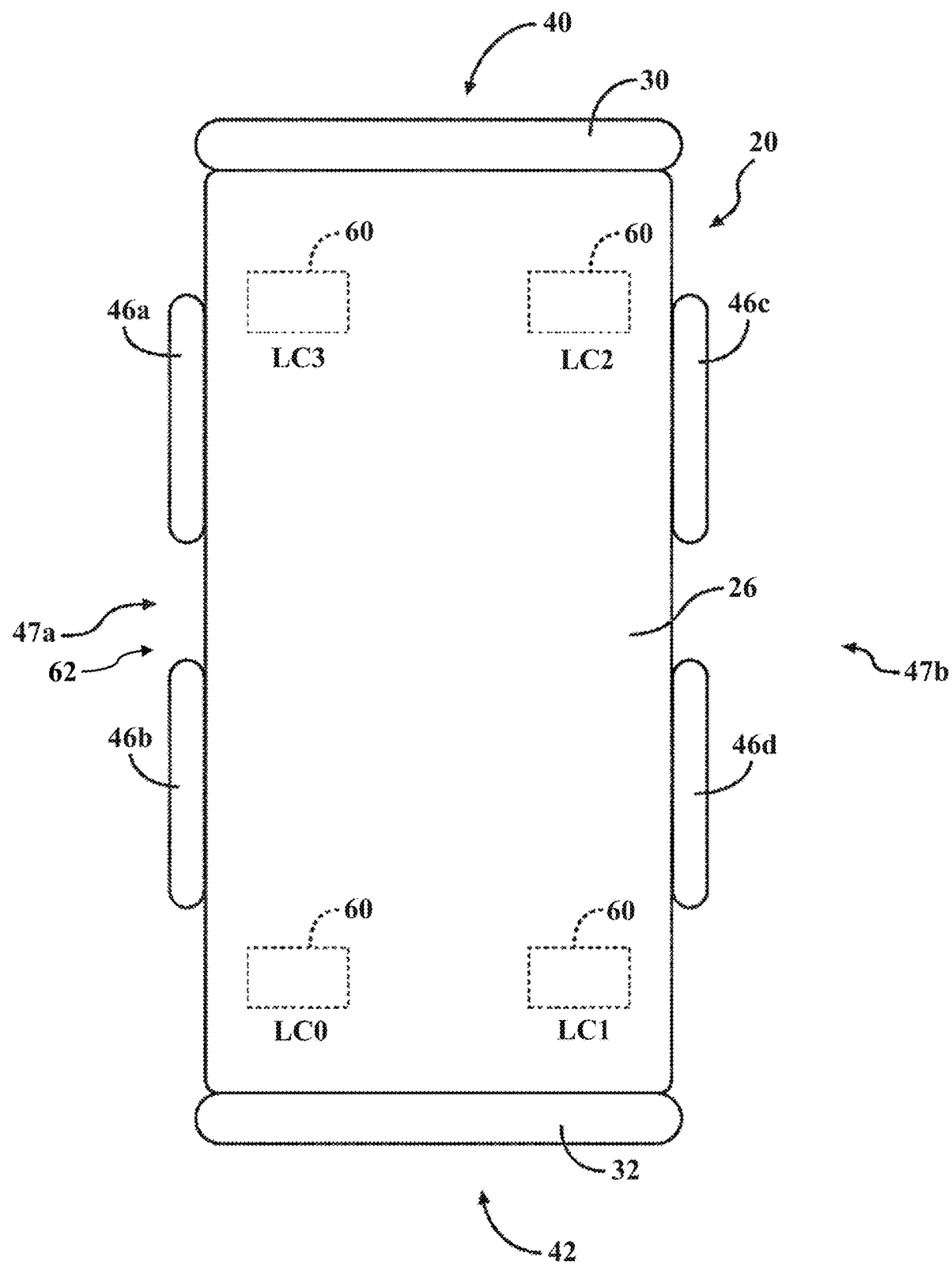
FIG. 4 depicts a plan view diagram of an illustrative layout of a load cell system according to the teachings of the present disclosure.
Figure 5:
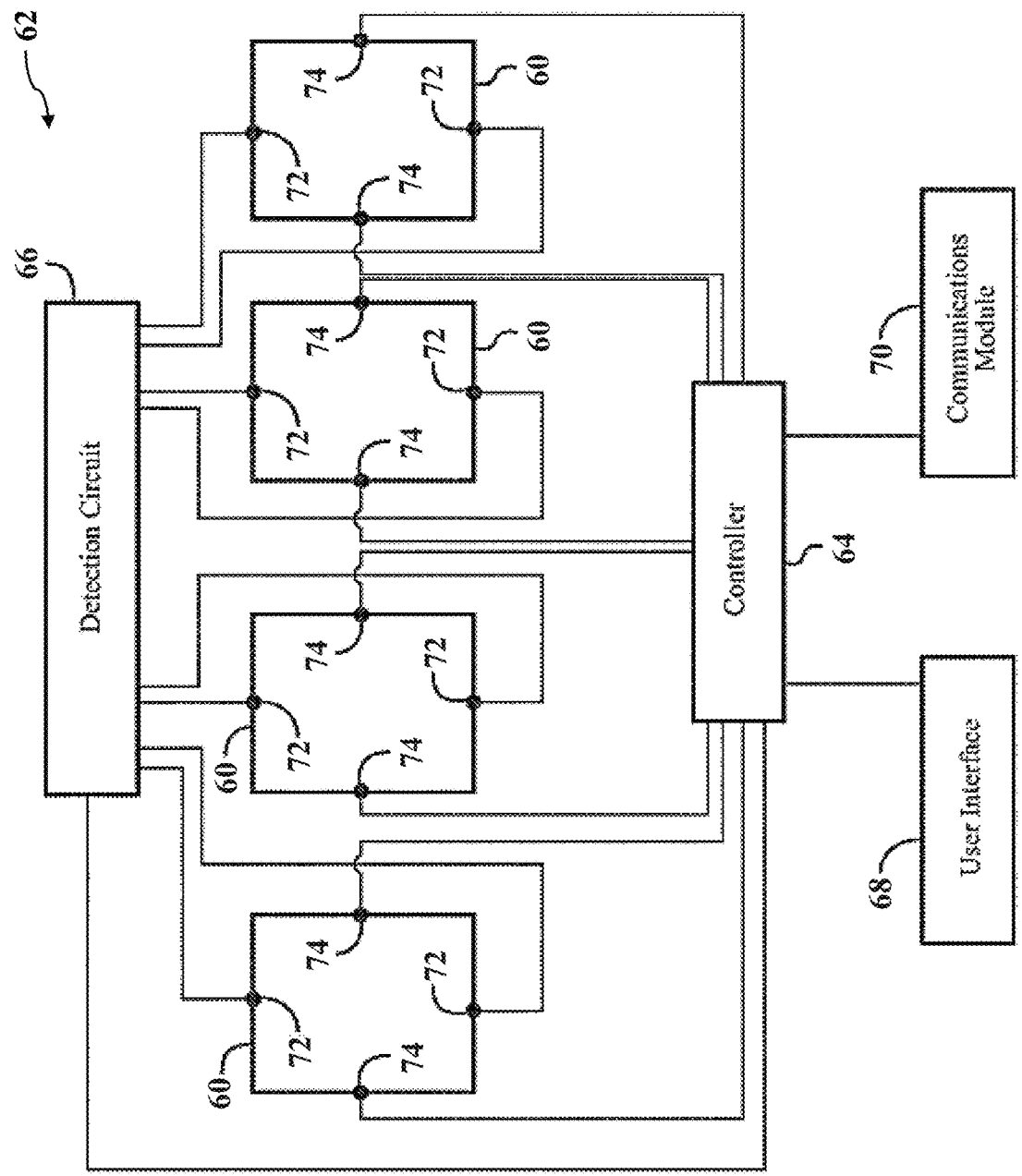
FIG. 5 depicts a functional block diagram of a load cell system according to the teachings of the present disclosure.

FIG. 4 depicts an example layout of a load cell system 62 which comprises load cells 60 positioned at one or more locations about the patient support apparatus 18 such that measurements of various load signals at different locations may be obtained by the controller 64. Here, it will be appreciated that the load cells 60 each generate respective load signals indicative of forces acting on or otherwise applied to the load cells 60. In FIG. 5, the load cells 60 are each arranged proximate to one of the four corners of the litter 26 which, as noted above, is operatively connected to the lifts 24 (and, thus, the base 22) via the load cell system 62. As will be appreciated from the subsequent description below, different types of lifts 24, bases 22, litters 26, and load cell systems 62 are contemplated by the present disclosure, and the patient support apparatus 18 could be configured in a number of different ways.

As shown, a first load cell (LC0) 60 is positioned adjacent a foot section 42 of the patient support apparatus 18 on a first side 47a. A second load cell (LC1) 60 is positioned on the second side 47b also near the foot section 42. A third load cell (LC2) 60 and a fourth load cell (LC3) 60 are positioned adjacent the head section 40 on the second side 47b and first side 47a, respectively. As noted above, the load cells 60 are positioned to sense the forces exerted on (or as force represented by) the litter 26 relative to another portion of the patient support apparatus 18 (e.g., the front and rear header assemblies 56, 58, the base 22, an intermediate frame, a weight frame, and the like). Such forces may be exerted by the weight of a patient positioned on patient support deck 28, by objects placed on the mattress 36, or by other people or objects. Accurate readings from the load cells 60 are important for various reasons, such as determining the weight fluctuations of a patient over time and the patient's center of gravity at any given time.

During an initial calibration procedure for a load cell system 62, one or more calibration values may be entered by a technician for each load cell 60 of the load cell system 62 to calibrate a sensitivity parameter 106 (see FIGS. 8A-8H and 9A-9H which will be described in greater detail below) and a zero-balance parameter 108 (see FIGS. 9A-9H which will be described in greater detail below) for each of the load cells 60. The calibration values for the sensitivity parameter 106 and the zero-balance parameter 108 of a load cell 60 may be provided by a manufacturer of the load cell 60 or may also be determined based on testing the load cell 60. The technician commonly needs to input calibration values for the zero-balance parameter 108 and a sensitivity parameter 106. The zero-balance parameter 108 is representative of the load output when no load is applied to the load cell 60. The sensitivity parameter 106 is representative of how the load output varies as an excitation voltage of the load cell 60 changes when subject to a predetermined load.

As will be appreciated from the subsequent description below, the systems and methods described herein significantly reduce possible incorrect entry of calibration values by a technician when manufacturing or servicing the patient support apparatus 18. Thus, the systems and methods of the present disclosure provide a more accurate and reliable way to calibrate load cell system 62 by reducing the possibility of human error when compared to the systems and methods of the prior art.

FIG. 5 depicts an example functional block diagram of a load cell system 62 according to the teaching of the present disclosure. The load cell system 62 may include the load cells 60, the controller 64, a detection circuit 66, one or more user interfaces 68, and the communication module 70. In various aspects, the load cell system 62 may function as a scale system, although it may also be used as an exit detection system. When functioning as a scale system, the load cells 60 are configured to measure the amount of weight that is supported on the litter 26, as noted above. Through the use of a tare control (e.g., on the user interface 68), the weight of the litter 26 and other components of the patient support apparatus 18 may be separated from the weight reading such that a weight of just the patient/occupant may be determined. When the load cell system 62 functions as an exit detection system, the load cell system 62 is configured to determine when the patient/occupant has left or is likely to leave the patient support apparatus 18. In various aspects, an alert or notification may be issued to appropriate personnel (e.g., a caregiver) upon such detection, which may be based on changes detected in the monitoring of the center of gravity of the patient. Other configurations are contemplated.

In the representative version depicted in FIG. 5, the controller 64 is disposed in communication with the detection circuit 66 and each load cell 60. The controller 64 is configured to read the outputs from each load cell 60 and to determine, based on the combination of outputs, the total weight or load that is being supported on litter 26. In addition, the controller 64 may be configured to maintain and utilize a tare weight so that the weight of the patient may be distinguished from the weight of the components of the patient support apparatus 18 and other non-patient items, such as bedding, pillows, etc.

The communication module 70 may include one or more transceivers that communicate with one or more off-board devices. In one aspect, the communication module 70 includes a Wi-Fi radio configured to communicate with wireless access points of a healthcare facility's computer network, thereby enabling the patient support apparatus 18 to communicate wirelessly with the computer network of the healthcare facility. The communication module 70 may also include an ethernet connection, or other wired circuitry, for enabling wired communication with the hospital network, as well as nurse call cable circuitry for coupling to a nurse call cable that communicates with a nurse call system.

The detection circuit 66 may be configured to supply a substantially constant activation voltage to the load cells 60. The detection circuit 66 may also be configured to perform one or both of the following additional functions: (1) detecting whether one or more of the load cells 60 are in an error state (e.g., they are not present, are not electrically coupled to the load cell system 62 properly, and/or are malfunctioning); and (2) detecting whether there are problems with the activation voltage supplied to the load cells 60. In carrying out either or both of these functions, the detection circuit 66 notifies the controller 64 if it has detected an error with the load cells 60 and/or an error with respect to the activation voltage supplied to the load cells 60. The controller 64, in response, sends a message to the user interface 68 and/or communication module 70 indicating that an error has been detected. The user interface 68 and/or the remote device in communication with the communication module 70 may then alert appropriate personnel in an audio, visual, and/or audiovisual manner. A similar circuit may be coupled to an accelerometer to detect error states and problems, and to notify appropriate personnel.

Each load cell 60 may include a pair of activation leads 72 and a pair of sensing or sensor leads 74 (see FIG. 5). Here, the detection circuit 66 is in electrical communication with the activation leads 72, but not with the sensor leads 74. The controller 64, in contrast, is in electrical communication with the sensor leads 74, but not the activation leads 72. One of each pair of the activation leads 72 of each load cell 60 is coupled to an activation voltage source, which supplies electrical power to the load cell 60, and the other of each pair of the activation leads 72 is coupled to ground. The sensor leads 74, rather than supplying electrical power, provide outputs to the controller 64 that are used to determine how much force is being exerted on the load cells 60. That is, the sensor leads 74 provide outputs that are correlated to the forces sensed by the load cells 60. In sum, the activation leads 72 provide power for the load cells 60 while the sensor leads 74 provide outputs that are indicative of the force applied against the load cells 60.

Although not shown in FIG. 5, the load cells 60 may be configured as Wheatstone bridges, wherein one or more strain gauges that are internal to the load cell 60 are arranged in one or more legs of the Wheatstone bridge. The other legs consist of known resistances. In other words, one of the strain gauges is effectively responsible for one of the resistance values. For certain types of load cells 60, it will be appreciated that strain gauges may be positioned in more than one leg of the Wheatstone bridge, but the strain gauges are geometrically arranged within the load cell to cooperatively sense the same magnitude, but not necessarily direction, of the applied force. When no forces are detected by the strain gauges of the load cell 60, the current flowing through each of the two paths of the Wheatstone bridge is generally balanced, and there is substantially no voltage drop between the two midpoints. However, when a force is detected, the current is no longer balanced, and a voltage is detected between the two midpoints. The two midpoints correspond to the sensor leads 74 while the two activation leads 72 correspond to the endpoints of the Wheatstone bridge.

With reference back to FIG. 3, the load cell system 62 of the present disclosure provides a simplified calibration procedure with the use of calibration reference symbols 61 that minimizes human error during a calibration procedure. A calibration reference symbol 61 may be assigned to each of the load cells 60 in order to define one or more representative calibration values for calibrating the sensitivity parameter 106 and/or the zero-balance parameter 108 of the load cell 60. During the calibration procedure, the technician need only enter the calibration reference symbol 61 for the sensitivity parameter 106 and/or the zero-balance parameter 108 instead of numerical values with a number of significant figures. The calibration reference symbol 61 is shown and contemplated as a letter of the English alphabet throughout the disclosure; however, it is understood that any suitable symbols may be utilized so long as they are sufficient to differentiate from each other. By way of non-limiting example, symbols such as a circle, a square, a triangle, etc., may be used for the calibration reference symbols 61.

With reference to FIGS. 6A and 6B, a sensitivity calibration table 76 and a zero-balance calibration table 77 are shown. The calibration tables 76, 77 may be generated during a testing phase, such as where a large number of load cells 60 may be gathered and grouped into batches 89, 91 based on a certain calibration value for the sensitivity parameter 106 and/or a certain calibration value for the zero-balance parameter 108. Thus, each load cell 60 may be assigned to a particular batch for the sensitivity parameter 106 and also a particular batch for the zero-balance parameter 108. While this disclosure contemplates grouping the load cells 60 into batches 89, 91 based on calibration values for the zero-balance parameters 108 and the sensitivity parameters 106, a calibration value for the zero-balance parameter 108 of a load cell 60 may be derived from the calibration value of the sensitivity parameter 106. Thus, in some versions, grouping of the load cells 60 into batches 89, 91 based on the calibration values for the zero-balance parameter 108 of the load cells 60 may be omitted. Other configurations are contemplated.

An exemplary sample dataset taken from a larger group of load cells is shown in the calibration tables 76, 77. The load cells 60 may be identified by serial numbers 81, 83, or another suitable identifier, shown in the first column of the calibration tables 76, 77. For each load cell 60 in the sample group, a calibration value (mV/V) 85 for the sensitivity parameter 106 is shown in the sensitivity calibration table 76 and a calibration value (mV/V) 87 for the zero-balance parameter 108 is shown in table 77. The load cells 60 may be grouped into batches 89, 91 based on the calibration values 85, 87 for the sensitivity parameter 106 and the zero-balance parameter 108 according to one or more predefined rules. The predefined rules may specify the number of batches 89, 91 and ranges for each of the batches 89, 91. Each batch 89, 91 may span a predefined range of calibration values and each batch 89, 91 may be labeled with a batch identifier 93, 95 that corresponds to a respective calibration reference symbol 61. The batch identifiers 93, 95 for the sensitivity calibration table 76 may be different than the batch identifiers for the zero-balance calibration table 77.

As shown in the sensitivity calibration table 76, the load cells 60 are grouped into four batches 89 with associated batch identifiers A 93-1, B 93-1, C 93-3, and D 93-4 in this representative version. Batch A 93-1 may include load cells 60 with calibration values 85 for the sensitivity parameter 106 from 1.080 (mV/V) to 1.099 (mV/V), Batch B 93-2 may include load cells 60 with calibration values 85 for the sensitivity parameter 106 from 1.091 (mV/V) to 1.0959 (mV/V), Batch C 93-3 may include load cells 60 with calibration values 85 for the sensitivity parameter 106 from 1.96 to 1.9999 (mV/V), and Batch D 93-4 may include load cells 60 with calibration values 85 for the sensitivity parameter 106 from 2.0 (mV/V) and above.

As shown in the zero-balance calibration table 77, the load cells are grouped into four batches 91 with associated batch identifiers W 95-1, X 95-2, Y 95-3, and Z 95-4 in this representative version. Batch W 95-1 may include load cells 60 with calibration values 87 for the zero-balance parameter 108 less than 0 (mV/V), Batch X 95-2 may include load cells 60 with calibration values 87 for the zero-balance parameter 108 spanning from greater than 0 (mV/V) to 0.25 (mV/V), Batch Y 95-3 may include load cells 60 with calibration values 87 for the zero-balance parameter 108 spanning from 0.25 (mv/V) to 0.49 (mV/V), and Batch Z 95-4 may include load cells 60 with calibration values 87 for the zero-balance parameter 108 spanning greater than 2.0 (mV/V).

Once the load cells 60 are sorted or grouped into batches 89, 91 according to the calibration values 85, 87 for the sensitivity and zero-balance parameters 106, 108, a representative calibration value 97, 99 may be determined for each batch 89, 91. The representative calibration value 97, 99 for each batch 89, 91 may be defined based on one or more statistical measures of the batch 89, 91. As shown in the calibration tables 76, 77, the representative calibration values 97, 99 are based on an average of the calibration values 85, 87 for each batch 89, 91. For example, for Batch A 93-1 of the sensitivity calibration table 76, the representative calibration value 97-1 is based on the average of the calibration values 85 for the sensitivity parameter 106 of each load cell 60 in Batch A 93-1. While the example is provided that the representative calibration values 97 are based on the average of the calibration values in the batch, it is understood that another statistical measure may be used to determine the representative calibration value 97 for each batch 89, 91 such as a median sensitivity value, a maximum sensitivity value, a minimum sensitivity value, etc. Other configurations are contemplated.

Once all of the load cells 60 are grouped into batches 89, 91 based on calibration values 85, 87 for the sensitivity and zero-balance parameters 106, 108, each of the load cells 60 may be labeled with an appropriate calibration reference symbol 61. In some examples, such as is shown in FIG. 3, calibration reference symbols 61 may be placed directly on one of the surfaces of the load cell 60 (e.g., printed on a label, stamped on a tag, and the like). In other examples, the calibration reference symbols 61 may not be placed directly on the load cell 60 but incorporated into written material associated with the load cells 60, for example, an instruction manual, datasheet, etc. The sensitivity calibration table 76 and the zero-balance calibration table 77 shown in FIGS. 6A and 6B may serve as the basis for a lookup table that may be stored in the memory of the controller 64 and later accessed during the calibration procedure. Other configurations are contemplated.

Figure 7:
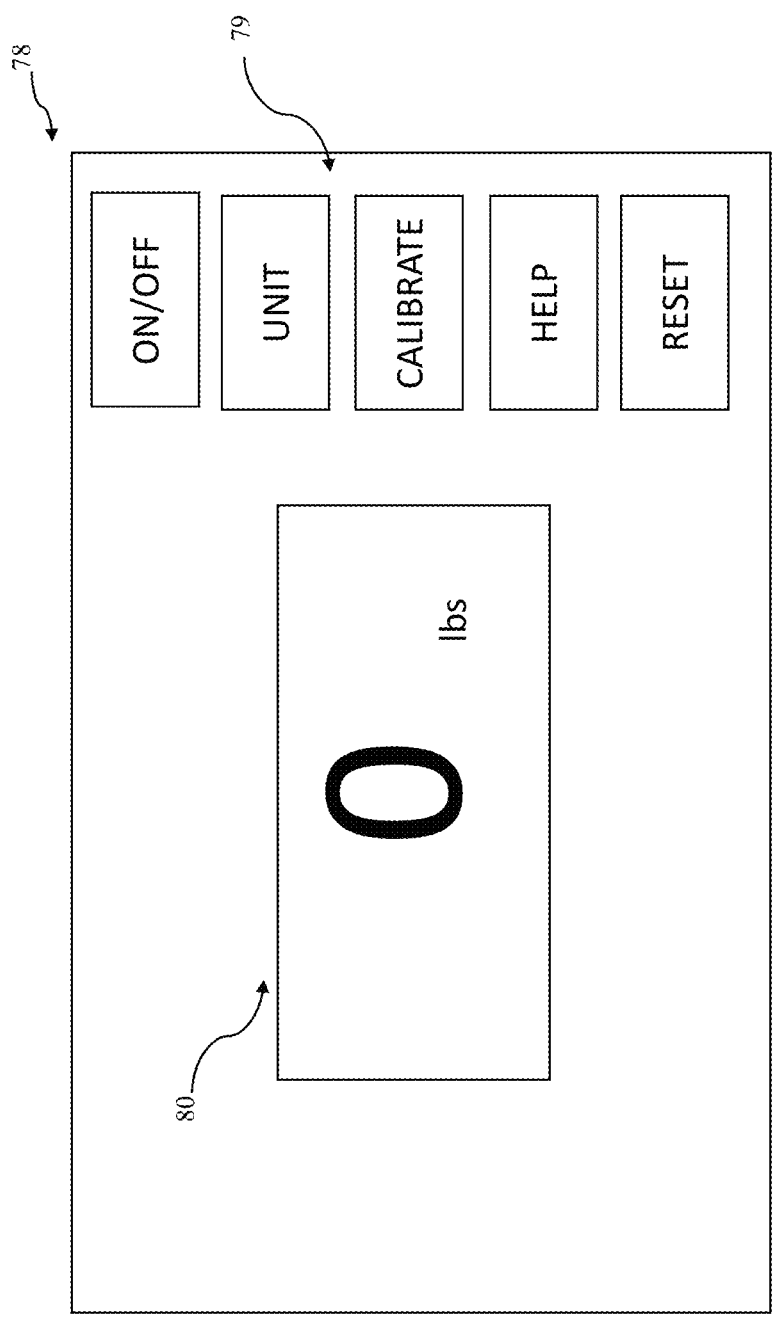
FIG. 7 depicts a default screen of a user interface for a load cell system according to the teachings of the present disclosure.

With reference to FIG. 7-9, the user interface 68 of the load cell system 62 will be described. A default screen 78 of the user interface 68 is shown relative to the load cell system 62 in FIG. 7. The default screen 78 may include a display section 80 and touch buttons 79 including an on/off button, a unit button (lb/kg), a calibrate button, a help button, and a reset button. The display section 80 is configured to display the weight of the patient. The on/off button may be used to turn on/off the load cell system 62. The unit button may be configured to switch the units displayed on the default screen 78, for example, to switch from pounds to kilograms. A help button may be configured to launch up an instruction screen or help menu. The reset button may be configured to reset the load cell system 62. The calibration button is configured to initiate a calibration procedure. Throughout this disclosure, user engagement of the calibration button may be referred to as a user selected calibration event.

With reference to FIGS. 8A-8H and 9A-9H, the calibration procedure may begin with a two-step process of inputting virtual symbols 104 representative of the calibration reference symbols 61 on each of the load cells 60. Exemplary screens for the user interface 68 during the first step of the two-step input process are shown in FIGS. 8A-8H and 9A-9H. While this disclosure contemplates a two-step process for inputting virtual symbols 104 representative of the calibration reference symbols 61, in some examples, the calibration procedure may begin with just a single input step and the second step as discussed further below may be forgone.

The user interface 68 may display the screens shown in FIGS. 8A-8H, as the first step of the two-step process, when the load cell system 62 is configured to be calibrated solely based on the virtual symbols 104 for the sensitivity parameters 106 and the user interface 68 may display screens shown in FIGS. 9A-9H, as the first step of the two-step process, when the load cell system 62 is configured to be calibrated based on virtual symbols 104 for both the sensitivity parameter 106 and zero-balance parameter 108 for each load cell 60.

Each of the screens shown in FIGS. 8A-8H and 9A-9H include a header section 82, an interactive section 84, and a process control section 86. The header section 82 displays which of the load cells 60 the screen is associated with. For example, the screens titled "Scale Calibration—Foot Left" shown in FIGS. 8A, 8B, 9A, and 9B may be associated with the first load cell (LCO) 60, the screens titled "Scale Calibration—Foot Right" shown in FIGS. 8C, 8D, 9C, and 9D may be associated with the second load cell (LC1) 60, the screens titled "Scale Calibration—Head Left" shown in FIGS. 8E, 8F, 9E, and 9F may be associated with the third load cell (LC2) 60, and the screens title "Scale Calibration—Head Right" shown in FIGS. 8G, 8H, 9G, and 9H may be associated with the fourth load cell (LC3) 60. The header section 82 may include a back button 88 that is configured to return the user to the previous screen.

The interactive section 84 may include a message portion 90 that displays one or more messages or instructions to the user. For example, the messages or instructions may be to select the virtual symbol 104 corresponding to the calibration reference symbol 61 on the load cell 60. The interactive section 84 may also include a touch button, a drop-down menu, and/or a field configured to receive input from the user regarding the virtual symbol 104 corresponding to the calibration reference symbol 61 on the load cell 60. When the input section includes a field, a virtual keyboard may also be displayed as to allow the user to input the alphanumeric symbols on the touch display. Other configurations are contemplated.

In the illustrated examples, the interactive section 84 includes touch buttons 92 labeled with virtual symbols A 104-1, B 104-2, C 104-3, and D 104-4, as shown in FIGS. 8A-8H and additional touch buttons 92 labeled with virtual W 104-5, X 104-5, Y 104-6, and Z 104-7, as shown in FIGS. 9A-9H. Each of the touch buttons 92 may have a first state (S1) and a second state (S2). The default state of each of the four touch buttons 92 may be set to the first state where all of the touch buttons 92 are displayed in a similar manner (e.g., same color or same blinking pattern). Once the user has selected one of the four touch buttons 92, the controller 64 may set the selected touch button 92 to the second state (S2). When the selected touch button 92 is set to the second state (S2), a characteristic (e.g., color or blinking pattern) of the selected touch button 92 is changed by the controller 64 such that the user is able to visually discern which touch button 92 was selected. When the user engages the touch button 92 in the second state (S2), the controller 64 may switch the touch button 92 back to the first state (S1).

The process control section 86 includes one or more control buttons such as a cancel button and a next button. The user may select the cancel button at any time during the procedure to cancel the calibration procedure. The next button allows the user to move onto the next step in the procedure. For example, when the user engages the next button subsequent to selecting the touch button 92 with the virtual symbol 104 corresponding to the calibration symbol for the first load cell (LCO) 60, the controller 64 displays the first step screen for the second load cell (LC1) 60 on the user interface 68. In another example, when the user engages the next button subsequent to selecting the touch button 92 with the relevant virtual symbol 104 for the fourth load cell (LC3) 60, the controller 64 displays a confirmation screen on the user interface, discussed in greater detail below. In some examples, the controller 64 may be configured to change a characteristic (e.g., color or blinking pattern) of the next button once one of the touch buttons 92 has been selected, signaling to the user that the next button may be engaged when ready.

Figure 10:
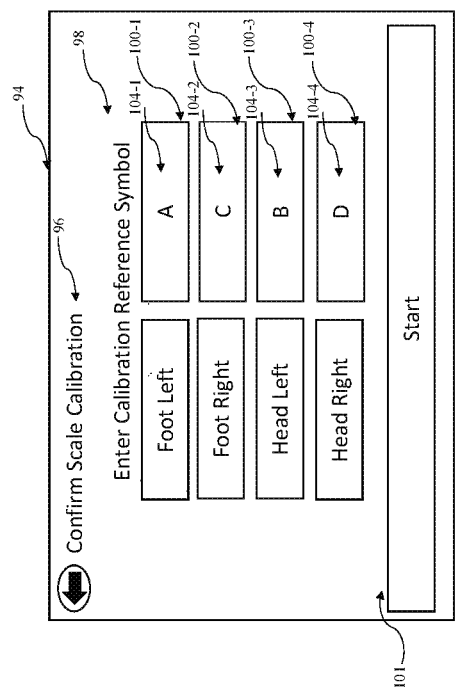
FIG. 10 depicts a confirmation screen of a user interface associated with a second step of a two-step process for inputting calibration values for a sensitivity parameter of a load cell system according to the teachings of the present disclosure.
Figure 11:
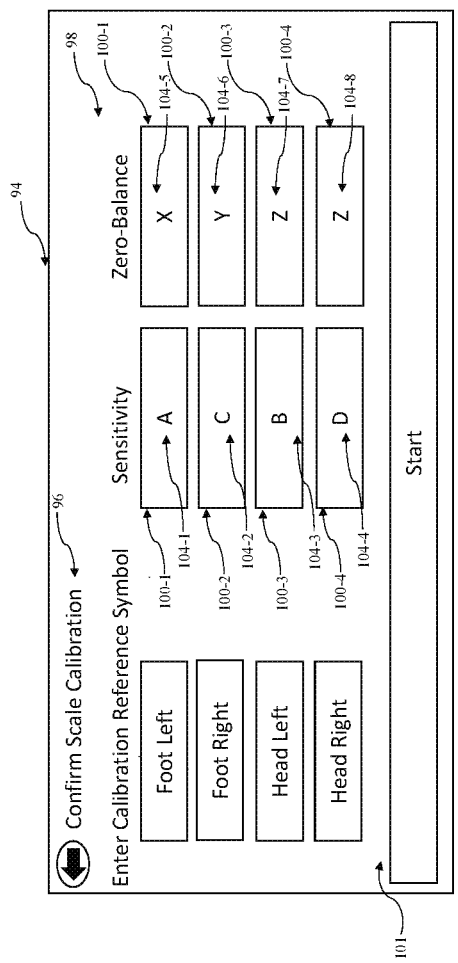
FIG. 11 depicts a confirmation screen of a user interface associated with a second step of a two-step process for inputting calibration values for a sensitivity parameter and a zero-balance parameter of a load cell system according to the teachings of the present disclosure.

With reference to FIGS. 10 and 11, as previously discussed, once the user has input all of the virtual symbols 104 for the calibration reference symbols 61 for each of the load cells 60 in the load cell system 62 at the first step of the two-step input process, the user may be prompted to a confirmation screen 94. The confirmation screen 94 serves as the second step in the two-step input of the virtual symbols 104 corresponding to the calibration reference symbols 61. When the load cell system 62 is configured to be calibrated solely based on the calibration values for the sensitivity parameters 106 of the load cells 60, the confirmation screen 94 may correspond to FIG. 10. When the load cell system 62 is configured to be calibrated based on both the calibration values for the sensitivity parameter 106 and the zero-balance parameter 108, the confirmation screen 94 may correspond to FIG. 11.

The confirmation screen 94 may include a header section 96, an interactive section 98, and a process control section 101. The interactive section 98 may include fields 100, such as a first field 100-1, a second field 100-2, a third field 100-3, and a fourth field 100-4 as shown in FIG. 10 and additionally, a fifth field 100-5, a sixth field 100-6, a seventh field 100-7, and an eighth field 100-8, as shown in FIG. 11. The fields 100 are for the user to confirm that the proper virtual symbol 104 was selected at the first step for each of the load cells 60.

For example, the user may confirm input of the virtual symbol 104-1 for the sensitivity parameter 106 of the first load cell (LC0) 60 at the first field 100-1, input of the virtual symbol 104-2 for the sensitivity parameter 106 of the second load cell (LC1) 60 at the second field 100-2, input of the virtual symbol 104-3 for the sensitivity parameter 106 of the third load cell (LC2) 60 at the third field 100-3, input of the virtual symbol 104-4 for the sensitivity parameter 106 of the fourth load cell (LC3) 60 at the fourth field 100-4, input of the virtual symbol 104-5 for the zero-balance parameter 108 of the first load cell (LC0) 60 at the fifth field 100-5, input of the virtual symbol 104-6 for the zero-balance parameter 108 of the second load cell (LC1) 60 at the sixth field 100-6, input of the virtual symbol 104-7 for the zero-balance parameter 108 of the third load cell (LC2) 60 at the seventh field 100-7, and input of the virtual symbol 104-8 for the zero-balance parameter 108 of the fourth load cell (LC3) 60 at the eighth field 100-8.

The process control section 101 for the confirmation screen includes a start button that may be engaged by the user to start calibrating the load cells 60 once all of the virtual symbols are entered in at the second step. The controller 64 may be configured to check to see whether the virtual symbols 104 input at the confirmation screen 94 match the previously selected virtual symbols 104 at the first step. The controller 64 may generate an error message on the user interface 68 if it is determined that any of the virtual symbols 104 selected at the first step do not match the virtual symbols 104 input at the second step. For example, if the user selects the touch button 92 with the virtual symbol "A" 104-1 at screen 8A (i.e., "Scale Calibration—Foot Left") and at the confirmation screen inputs the virtual symbol 104-2 "B" into field 100-1, the controller 64 generates an error message. The error message may prompt the user to double check the input at the relevant load cell screen and/or the confirmation screen 94.

During the calibration procedure, the controller 64 determines a representative calibration value 97, 99 based on the selected virtual symbols 104 corresponding to the calibration reference symbols 61. The controller 64 may determine the representative calibration values 97, 99 based on the virtual symbols 104 by matching the virtual symbols 104 with one or more batche identifiers 93, 95 from the lookup table corresponding to the calibration table 76, 77 stored in memory. For example, the virtual symbol "A" 104-1 may be matched with batch identifier "A" 93-1, the virtual symbol "B" 104-2 may be matched with batch identifier "B" 93-2, the virtual symbol "C" 104-3 may be matched with batch identifier "C" 93-3, and virtual symbol "D" 104-4 may be matched with batch "D" 104-4. Once the controller 64 identifies the relevant batch identifiers 93, 95, the controller 64 is able to determine the associated representative calibration values 97, 99 for each of the batches 89, 91 and therefore the representative calibration value 97, 99 for each of the virtual symbols 104. The controller 64 may store the representative calibration values 97, 99 in another portion of its memory separate from the lookup table, such that the controller 64 may access the representative calibration values 97, 99 at a later time. For example, the controller 64 may use the stored representative calibration values 97, 99 along with an algorithm to determine the weight of a patient.

Figure 12:
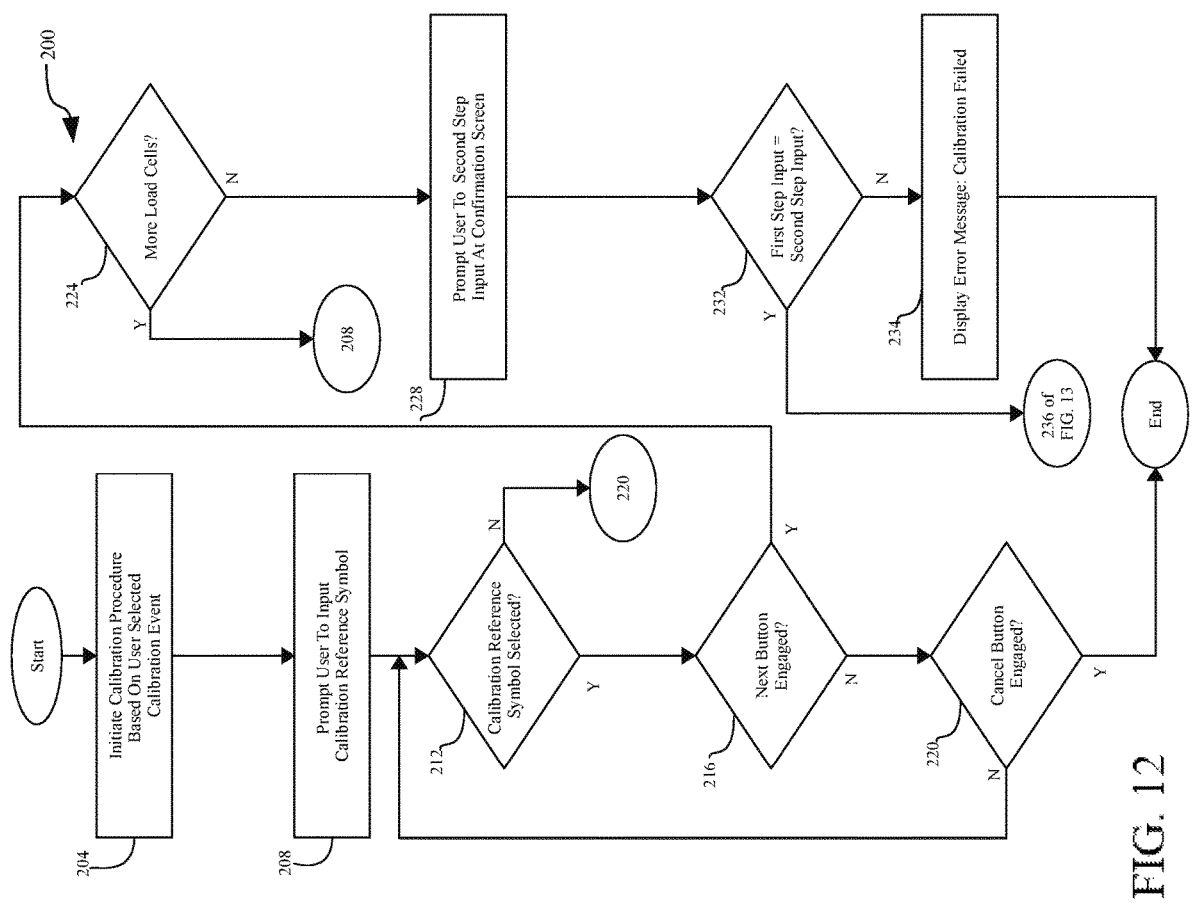
FIGS. 12 and 13 depict an example calibration method of a load cell system according to the teachings of the present disclosure.
Figure 13:
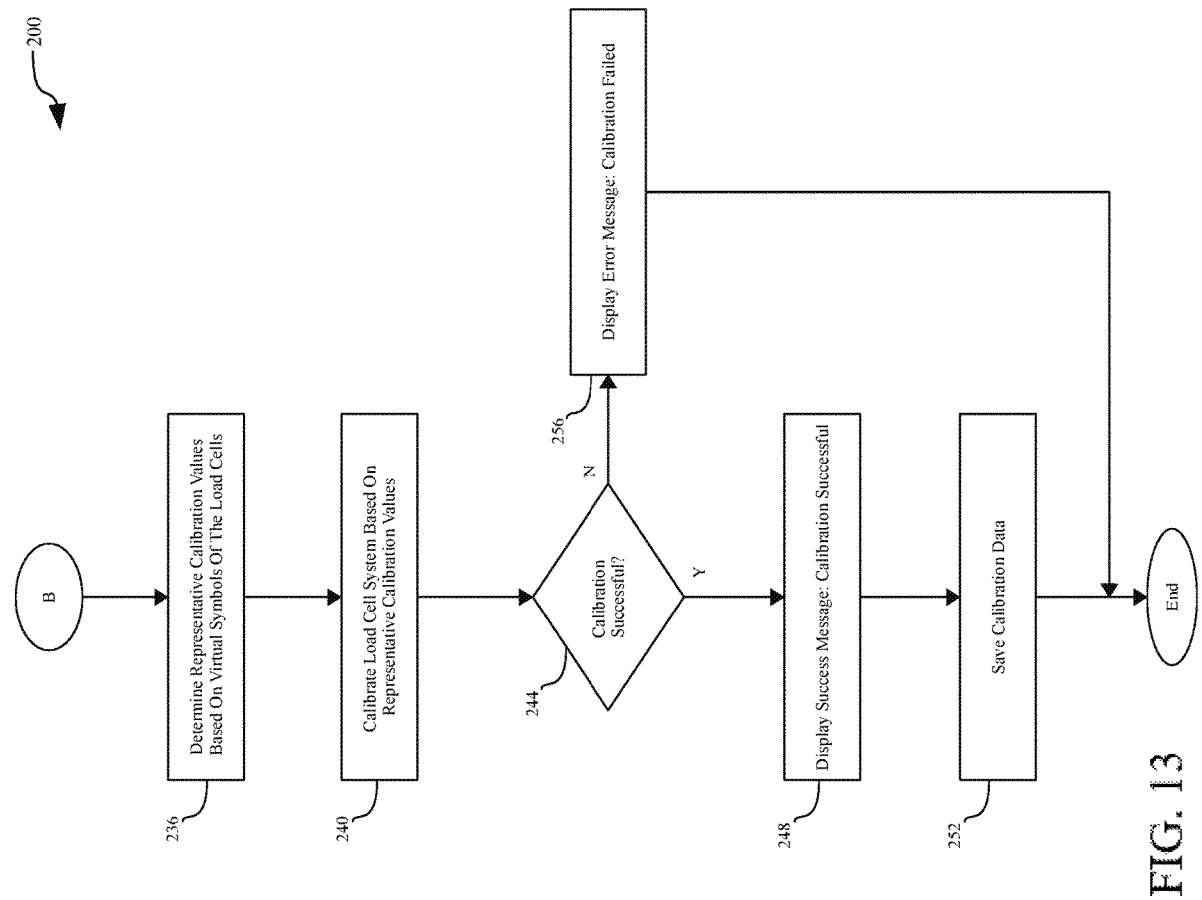

With reference to FIGS. 12 and 13, an exemplary method 200 performed by the controller 64 is depicted. As will be appreciated from the subsequent description below, this method merely represents an exemplary and non-limiting sequence of blocks to describe operation of the controller 64 and is in no way intended to serve as a complete functional block diagram of the control system.

The exemplary method 200 begins with a user selected calibration event, such as when the user engages the calibrate button. At 204, the controller 64 initiates the two-step process for inputting calibration values based on the user selected calibration event and continues at 208. At 208, the controller 64 via the user interface 68 prompts the user to select the virtual symbol 104 corresponding to the calibration reference symbol 61 for the first load cell (LC0) 60. At 212, the controller 64 determines whether the virtual symbol 104 has been selected. If yes, the method 200 continues at 216; otherwise, the method 200 continues at 220. At 216, the controller 64 determines whether the next button has been engaged. If so, the method 200 continues at 224; otherwise, the method 200 continues at 220. At 220, the controller 64 determines whether the cancel button has been engaged. If so, the controller 64 terminates the calibration procedure and the method 200 may end. If not, the method 200 continues back at 212.

At 224, the controller 64 determines whether there are any more load cells 60 in the load cell system 62. If so, the method continues at 208; otherwise, the method continues at 228. At 228, the controller 64 prompts the user to the second step of the two-step process for inputting the virtual symbols 104 corresponding to the calibration reference symbols 61 at the confirmation screen 94. At 232, the controller 64 determines whether the virtual symbols 104 input at the first step match the virtual symbols 104 input at the second step. If so, the method 200 continues at 236 of FIG. 12 otherwise, the method 200 continues at 234. At 234, the controller 64 displays an error message on the user interface 68 to indicate that the calibration procedure has failed, and the method 200 may end.

At 236, the controller 64 determines the representative calibration values 97, 99 based on the virtual symbols 104 of the load cells 60. At 240, the controller 64 calibrates the load cell system 62 based on the representative calibration values 97, 99 for each load cell 60. At 244, the controller 64 determines whether calibration was successful. If so, the method continues at 248; otherwise, the method continues at 256. At 252, the controller 64 displays an error message on the user interface 68 to indicate that the calibration procedure has failed, and the method 200 may end. The controller 64 may also display one or more reasons why the calibration was not successful with the error message. At 248, the controller 64 displays a success message on the user interface 68 to indicate that the calibration procedure has been completed successfully. At 252, the controller 64 saves the calibration data and the method 200 may end. While the exemplary method 200 is shown as "starting" and "ending" in FIGS. 12 and 13 for illustrative purposes, it will be appreciated that the controller 64 may instead return to block 204. Furthermore, as noted above, the exemplary method 200 described above and depicted in FIGS. 12 and 13 are in no way intended to serve as a complete functional block diagram of the control system, and other configurations are contemplated.

The foregoing description is merely exemplary in nature and is not intended to limit the disclosure, its application, or uses. The broad teachings of the disclosure may be implemented in a variety of different forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the examples is described above as having certain features, any one or more of those features described with respect to any example of the disclosure may be implemented in and/or combined with features of any of the other examples, even if that combination is not explicitly described. In other words, the described examples are not mutually exclusive, and permutations of one or more examples with one another remain within the scope of this disclosure.

Spatial and functional relationships between elements (for example, between controllers, circuit elements, semiconductor layers, etc.) as may be described using various terms, including "connected," "engaged," "coupled," "adjacent," "next to," "on top of," "above," "below," and "disposed." Unless explicitly described as being "direct," when a relationship between first and second elements is described in the above disclosure, that relationship may be a direct relationship where no other intervening elements are present between the first and second elements, but may also be an indirect relationship where one or more intervening elements are present (either spatially or functionally) between the first and second elements.

As may be used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that may be of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The present disclosure also comprises the following clauses, with specific features laid out in dependent clauses, that may specifically be implemented as described in greater detail with reference to the configurations and drawings above.

CLAUSES

I. A patient support apparatus comprising:
a base;
a litter defining a patient support surface to support a patient thereon;
a load cell, being disposed between the base and the litter, configured to generate a load output representative of a load acting on the patient support surface, the load cell being associated with a calibration reference symbol assigned to the load cell to define a parameter of the load cell;
a user interface configured to receive user input of a virtual symbol corresponding to the calibration reference symbol; and
a controller in communication with the load cell and the user interface and being configured to:
  store a plurality of calibration reference symbols each associated with a respective batch of predefined calibration values, and a plurality of representative calibration values each associated with one of the plurality of calibration reference symbols;
  initiate a calibration procedure in response to a user selected calibration event;
  determine a representative calibration value based on the virtual symbol received from the user interface associated with the respective batch of predefined calibration values;
  calibrate the parameter of the load cell based on the representative calibration value determined based on the virtual symbol; and
  determine weight acting on the litter based on the calibrated parameter of the load cell.

II. The patient support apparatus of clause I, wherein the user interface is configured to display a plurality of predefined virtual symbols and the user input corresponds to a selection of one of the predefined virtual symbols.

III. The patient support apparatus of any of clauses I-II, wherein:
the calibration reference symbol is further defined as a first calibration reference symbol assigned to the load cell to define a first parameter of the load cell, and the load cell is further associated with a second calibration reference symbol assigned to the load cell to define a second parameter of the load cell;
the user input is further defined as a first user input, and the virtual symbol is further defined as a first virtual symbol corresponding to the first calibration reference symbol; and
the user interface is further configured to receive a second user input of a second virtual symbol corresponding to the second calibration reference symbol.

IV. The patient support apparatus of clause III, wherein the controller is further configured to:
store a plurality of second calibration reference symbols each associated with a respective batch of predefined second calibration reference values, and a plurality of second representative calibration values each associated with one of the plurality of second calibration reference symbols;
determine a second representative calibration value based on the second virtual symbol received from the user interface associated with the respective batch of predefined second calibration reference values; and calibrate the second parameter of the load cell based on the second representative calibration value determined based on the second virtual symbol.

V. The patient support apparatus of any of clauses I-IV, wherein the parameter corresponds to a sensitivity of the load cell representative of how the load output varies as an excitation voltage of the load cell changes when subject to a predetermined load.

VI. The patient support apparatus of any of clauses I-V, wherein the parameter corresponds to a zero-balance of the load cell representative of the load output when no load is applied to the load cell.

VII. The patient support apparatus of any of clauses I-VI, wherein the calibration reference symbol comprises a letter.

VIII. The patient support apparatus of any of clauses I-VII, wherein the load cell is labeled with the calibration reference symbol.

IX. The patient support apparatus of any of clauses I-VIII, wherein the representative calibration values is defined based on an average of predefined calibration values in each of the respective batches of predefined calibration values.

X. The patient support apparatus of any of clauses I-IX, wherein the representative calibration value is defined based on a median of predefined calibration values in each of the respective batches of predefined calibration values.

XI. The patient support apparatus of any of clauses I-X, wherein each of the respective batches of predefined calibration values are defined by different respective ranges of predefined calibration values.

XII. A method for calibrating a load cell of a patient support apparatus, the method comprising:
receiving, using a user interface, a user selected calibration event;
receiving, using the user interface, user input of a virtual symbol corresponding to a calibration reference symbol of the load cell to define a calibration value for a parameter of the load cell;
initiating, using a controller in communication with the load cell and the user interface, a calibration process in response to the user selected calibration event;
determining a representative calibration value based on the virtual symbol received from the user interface associated with a respective batch of predefined calibration values;
calibrating the parameter of the load cell based on the representative calibration value determined based on the virtual symbol;
generating, using the load cell, a load output representative of a load acting on the patient support apparatus; and
determining weight acting on a litter of the patient support apparatus based on the calibrated parameter of the load cell and the load output.

XIII The method according to clause XII, wherein the user interface is configured to display a plurality of predefined virtual symbols and the user input corresponds to a selection of one of the predefined virtual symbols.

XIV. The method according to any of clauses XII-XIII, wherein the parameter corresponds to a sensitivity of the load cell representative of how the load output varies as an excitation voltage of the load cell changes when subject to a predetermined load.

XV. The method according to any of clauses XII-XIV, wherein the parameter corresponds to a zero-balance of the load cell representative of the load output when no load is applied to the load cell.

XVI. The method according to any of clauses XII-XV, wherein the calibration reference symbol comprises a letter.

XVII. The method according to any of clauses XII-XVI, wherein the load cell is labeled with the calibration reference symbol.

XVIII. The method according to any of clauses XII-XVII, wherein the representative calibration value is defined based on an average of predefined calibration values in each of the respective batches of predefined calibration values.

XIX. The method according to any of clauses XII-XVII, wherein the representative calibration value is defined based on a median of predefined calibration values in each of the respective batches of predefined calibration values.

XX. The method according to any of clauses XII-XIX, wherein each of the respective batches of predefined calibration values are defined by different respective ranges of predefined calibration values.

What is claimed is:

1. A patient support apparatus comprising:
a base;
a litter defining a patient support surface to support a patient thereon;
a load cell, being disposed between the base and the litter, configured to generate a load output representative of a load acting on the patient support surface, the load cell being associated with a calibration reference symbol assigned to the load cell to define a parameter of the load cell;
a user interface configured to receive user input of a virtual symbol corresponding to the calibration reference symbol; and
a controller in communication with the load cell and the user interface and being configured to:
store a plurality of calibration reference symbols each associated with a respective batch of predefined calibration values, and a plurality of representative calibration values each associated with one of the plurality of calibration reference symbols;
initiate a calibration procedure in response to a user selected calibration event;
determine a representative calibration value based on the virtual symbol received from the user interface associated with the respective batch of predefined calibration values;
calibrate the parameter of the load cell based on the representative calibration value determined based on the virtual symbol; and
determine weight acting on the litter based on the calibrated parameter of the load cell.

2. The patient support apparatus of claim 1, wherein the user interface is configured to display a plurality of predefined virtual symbols and the user input corresponds to a selection of one of the predefined virtual symbols.

3. The patient support apparatus of claim 1, wherein:
the calibration reference symbol is further defined as a first calibration reference symbol assigned to the load cell to define a first parameter of the load cell, and the load cell is further associated with a second calibration reference symbol assigned to the load cell to define a second parameter of the load cell;

the user input is further defined as a first user input, and the virtual symbol is further defined as a first virtual symbol corresponding to the first calibration reference symbol; and the user interface is further configured to receive a second user input of a second virtual symbol corresponding to the second calibration reference symbol.

4. The patient support apparatus of claim 3, wherein the controller is further configured to:

store a plurality of second calibration reference symbols each associated with a respective batch of predefined second calibration reference values, and a plurality of second representative calibration values each associated with one of the plurality of second calibration reference symbols;

determine a second representative calibration value based on the second virtual symbol received from the user interface associated with the respective batch of predefined second calibration reference values; and calibrate the second parameter of the load cell based on the second representative calibration value determined based on the second virtual symbol.

5. The patient support apparatus of claim 1, wherein the parameter corresponds to a sensitivity of the load cell representative of how the load output varies as an excitation voltage of the load cell changes when subject to a predetermined load.

6. The patient support apparatus of claim 1, wherein the parameter corresponds to a zero-balance of the load cell representative of the load output when no load is applied to the load cell.

7. The patient support apparatus of claim 1, wherein the calibration reference symbol comprises a letter.

8. The patient support apparatus of claim 1, wherein the load cell is labeled with the calibration reference symbol.

9. The patient support apparatus of claim 1, wherein the representative calibration values is defined based on an average of predefined calibration values in each of the respective batches of predefined calibration values.

10. The patient support apparatus of claim 1, wherein the representative calibration value is defined based on a median of predefined calibration values in each of the respective batches of predefined calibration values.

11. The patient support apparatus of claim 1, wherein each of the respective batches of predefined calibration values are defined by different respective ranges of predefined calibration values.

12. A method for calibrating a load cell of a patient support apparatus, the method comprising:

receiving, using a user interface, a user selected calibration event;

receiving, using the user interface, user input of a virtual symbol corresponding to a calibration reference symbol of the load cell to define a calibration value for a parameter of the load cell;

initiating, using a controller in communication with the load cell and the user interface, a calibration process in response to the user selected calibration event;

determining a representative calibration value based on the virtual symbol received from the user interface associated with a respective batch of predefined calibration values;

calibrating the parameter of the load cell based on the representative calibration value determined based on the virtual symbol;

generating, using the load cell, a load output representative of a load acting on the patient support apparatus; and determining weight acting on a litter of the patient support apparatus based on the calibrated parameter of the load cell and the load output.

13. The method according to claim 12, wherein the user interface is configured to display a plurality of predefined virtual symbols and the user input corresponds to a selection of one of the predefined virtual symbols.

14. The method according to claim 12, wherein the parameter corresponds to a sensitivity of the load cell representative of how the load output varies as an excitation voltage of the load cell changes when subject to a predetermined load.

15. The method according to claim 12, wherein the parameter corresponds to a zero-balance of the load cell representative of the load output when no load is applied to the load cell.

16. The method according to claim 12, wherein the calibration reference symbol comprises a letter.

17. The method according to claim 12, wherein the load cell is labeled with the calibration reference symbol.

18. The method according to claim 12, wherein the representative calibration value is defined based on an average of predefined calibration values in each of the respective batches of predefined calibration values.

19. The method according to claim 12, wherein the representative calibration value is defined based on a median of predefined calibration values in each of the respective batches of predefined calibration values.

20. The method according to claim 12, wherein each of the respective batches of predefined calibration values are defined by different respective ranges of predefined calibration values.

* * * * *